United States Patent
Shirai et al.

(10) Patent No.: US 9,769,135 B2
(45) Date of Patent: Sep. 19, 2017

(54) INFORMATION PROCESSING DEVICE, INFORMATION PROCESSING CLIENT, ACCESS AUTHENTICATION METHOD, AND PROGRAM

(71) Applicant: SONY CORPORATION, Minato-ku (JP)

(72) Inventors: Taizo Shirai, Kanagawa (JP); Yu Tanaka, Tokyo (JP)

(73) Assignee: SONY CORPORATION, Tokyo (JP)

(*) Notice: Subject to any disclaimer, the term of this patent is extended or adjusted under 35 U.S.C. 154(b) by 0 days.

(21) Appl. No.: 14/028,985

(22) Filed: Sep. 17, 2013

(65) Prior Publication Data

US 2014/0108798 A1   Apr. 17, 2014

(30) Foreign Application Priority Data

Oct. 16, 2012 (JP) ................. 2012-229218

(51) Int. Cl.
*H04L 29/06* (2006.01)
*H04L 29/08* (2006.01)
*H04L 9/32* (2006.01)

(52) U.S. Cl.
CPC .......... *H04L 63/08* (2013.01); *H04L 63/0823* (2013.01); *H04L 9/3247* (2013.01); *H04L 67/1097* (2013.01)

(58) Field of Classification Search
CPC ... H04L 63/0428; H04L 63/08; H04L 9/0841; H04L 63/0823; H04L 63/0832; H04L 9/3247; H04L 67/1097; G06F 21/10; G06F 21/6218
See application file for complete search history.

(56) References Cited

U.S. PATENT DOCUMENTS

| | | | |
|---|---|---|---|
| 2006/0085341 A1* | 4/2006 | Grim, III | G06Q 30/02 705/50 |
| 2006/0195692 A1* | 8/2006 | Kuhlman et al. | 713/166 |
| 2007/0118740 A1* | 5/2007 | Deishi | 713/158 |
| 2007/0177740 A1* | 8/2007 | Nakajima | G06F 21/6218 380/277 |
| 2010/0022217 A1* | 1/2010 | Ketari | 455/411 |
| 2010/0037062 A1* | 2/2010 | Carney | 713/176 |
| 2010/0158254 A1* | 6/2010 | Schaad et al. | 380/282 |
| 2010/0293609 A1* | 11/2010 | Laasik | 726/10 |
| 2012/0204032 A1* | 8/2012 | Wilkins et al. | 713/170 |
| 2012/0297183 A1* | 11/2012 | Mukkara et al. | 713/153 |
| 2013/0117861 A1* | 5/2013 | Aussel | G06F 17/30253 726/29 |

FOREIGN PATENT DOCUMENTS

| | | |
|---|---|---|
| JP | 2005-209181 | 8/2005 |
| JP | 2010-244432 | 10/2010 |

* cited by examiner

*Primary Examiner* — Kambiz Zand
*Assistant Examiner* — Ghodrat Jamshidi
(74) *Attorney, Agent, or Firm* — Chip Law Group

(57) ABSTRACT

There is provided an information processing device including a public key setter that sets a public key corresponding to a public-key authentication scheme in an access area defined as a given area of an object of access, and a device authentication processor that authenticates access to the access area against a secret key paired with the public key.

18 Claims, 15 Drawing Sheets

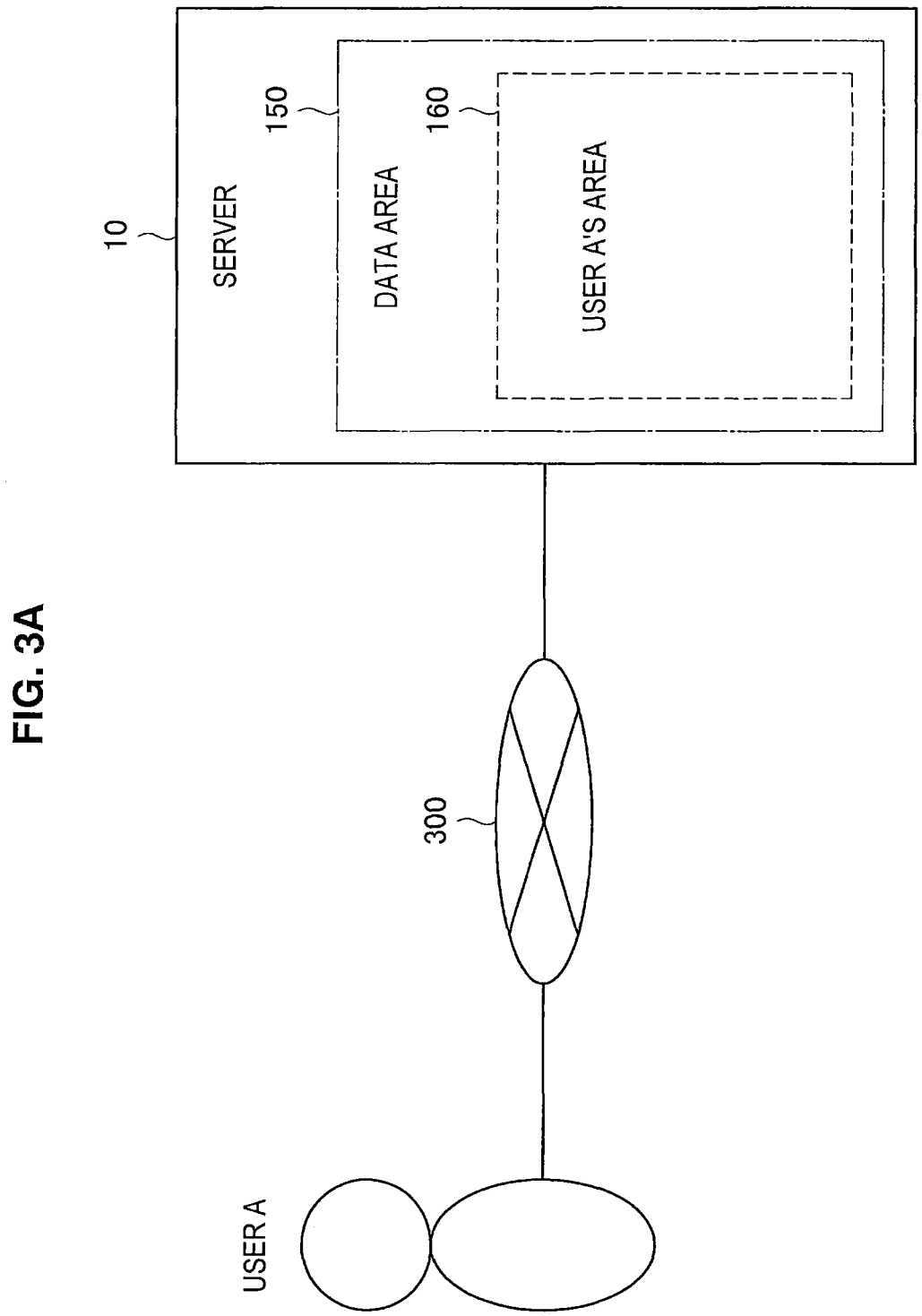

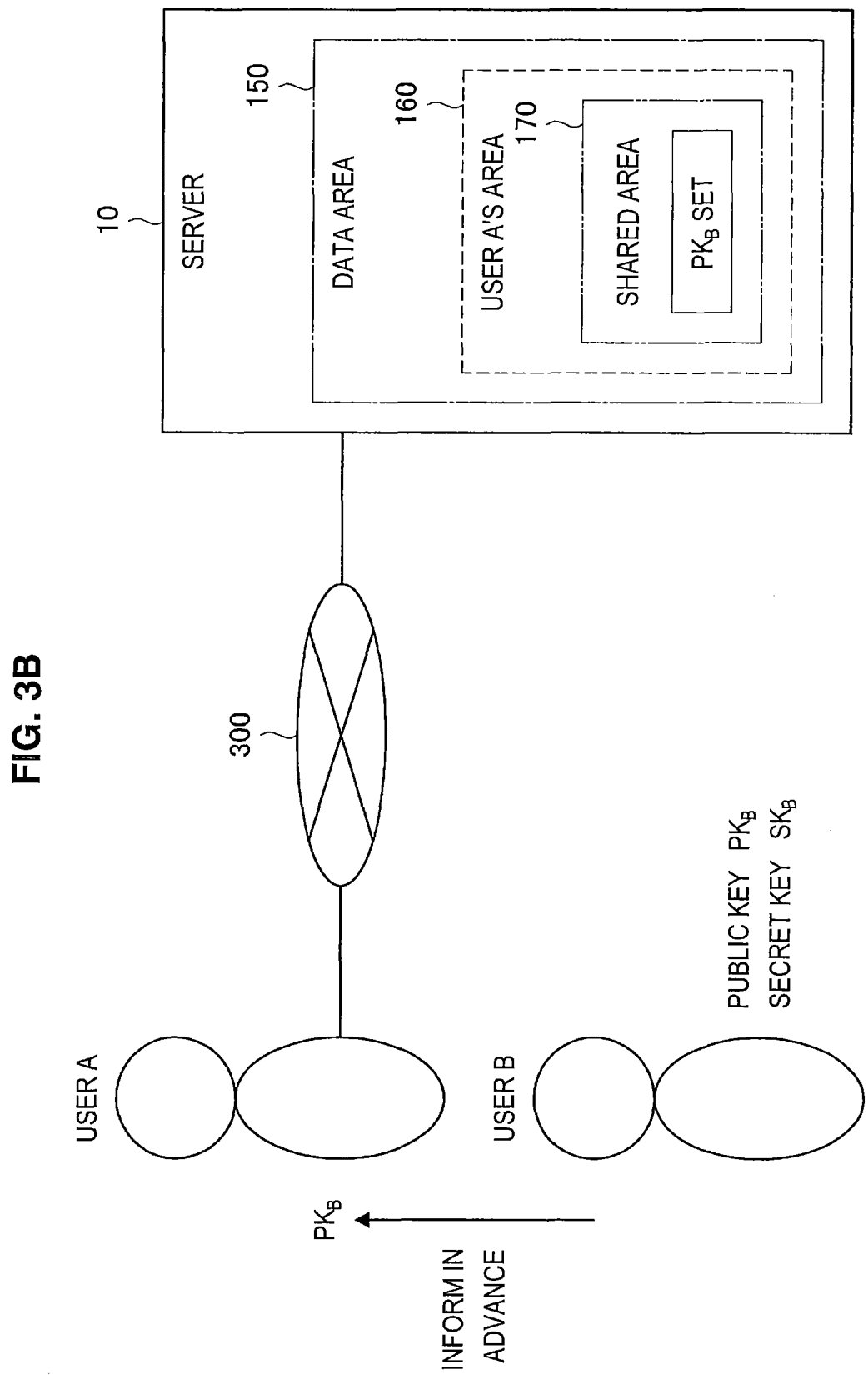

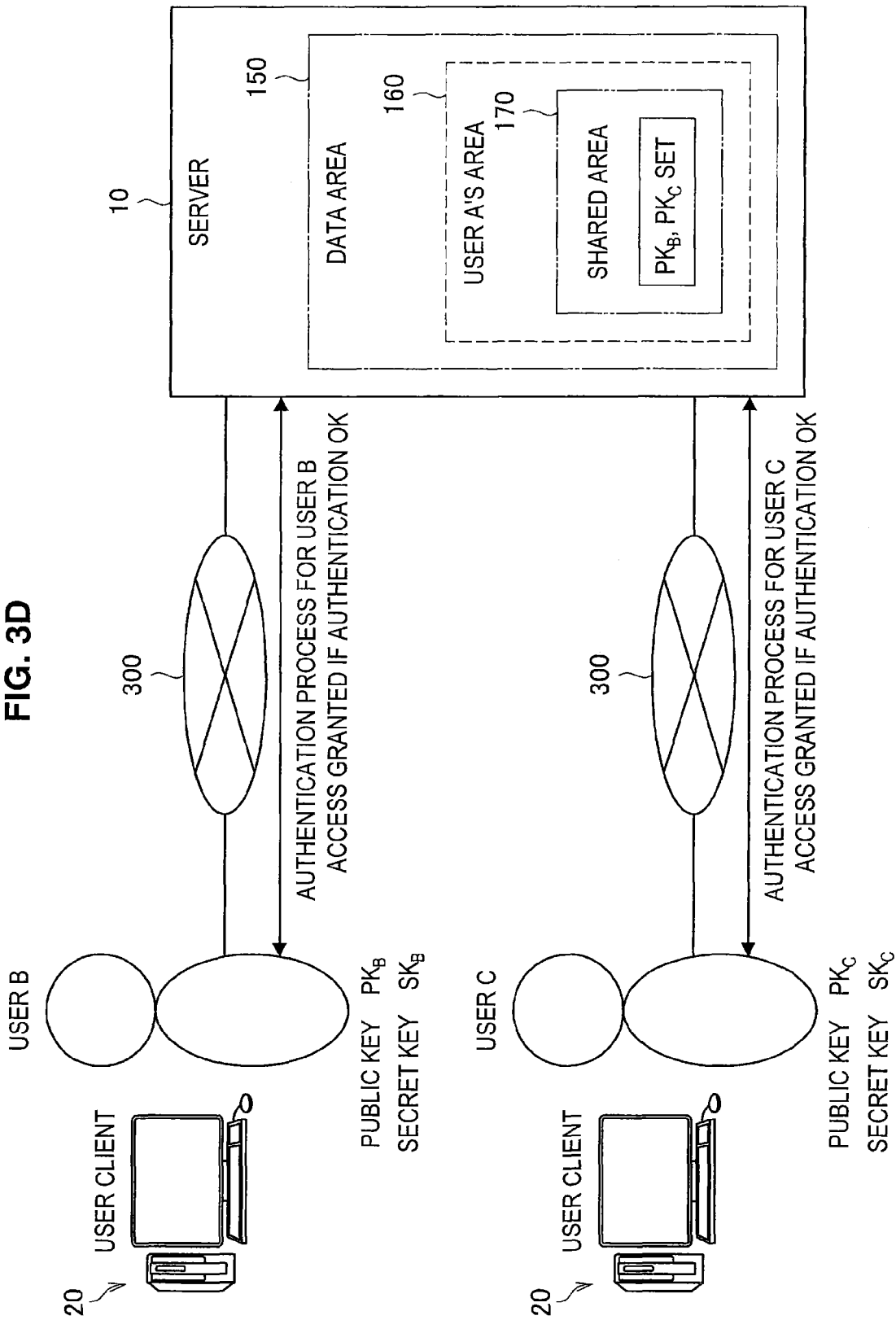

PUBLIC KEY LIST

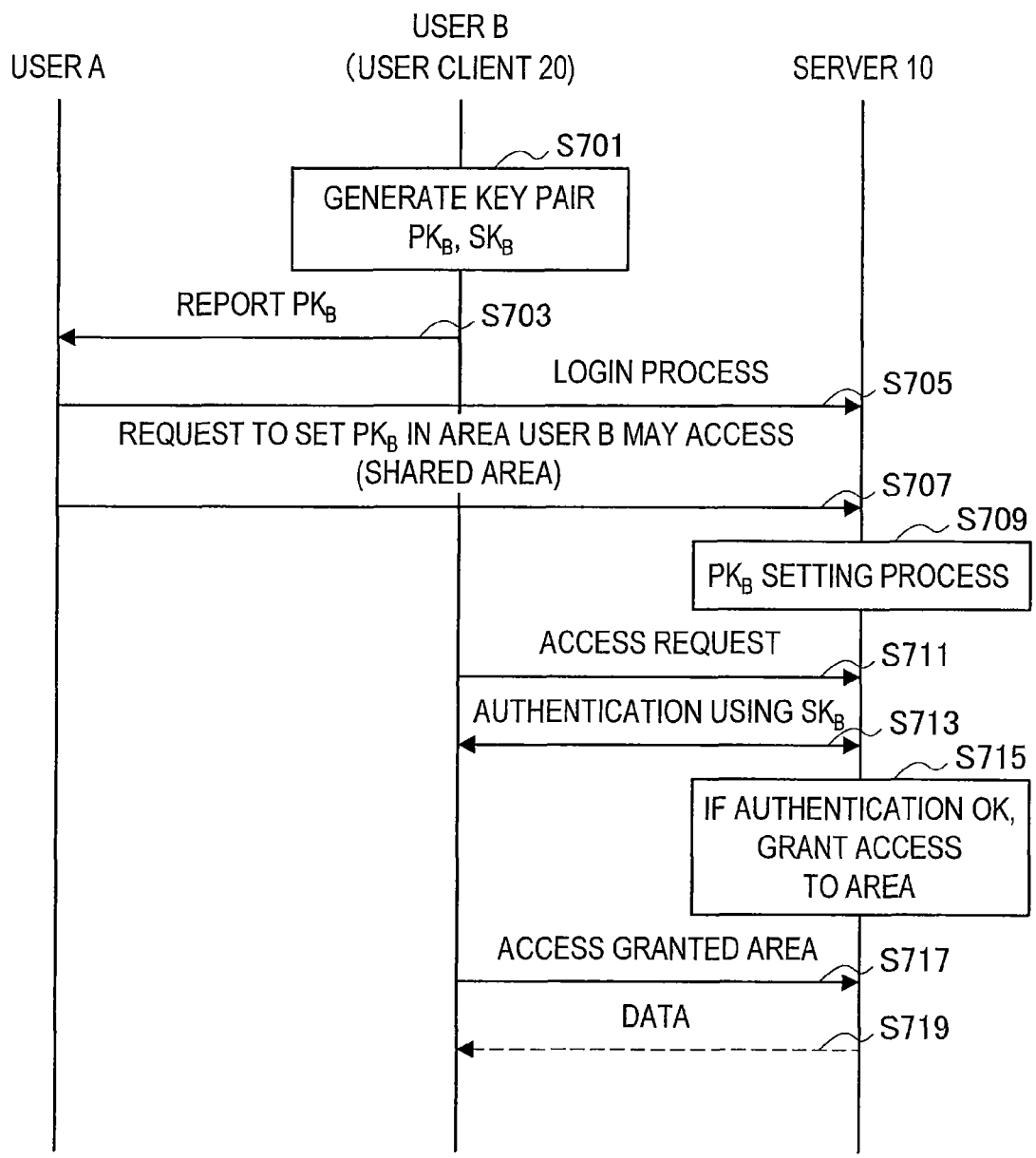

SET
PUBLIC KEY PK

KEY AUTHENTICATION

SECRET KEY SK

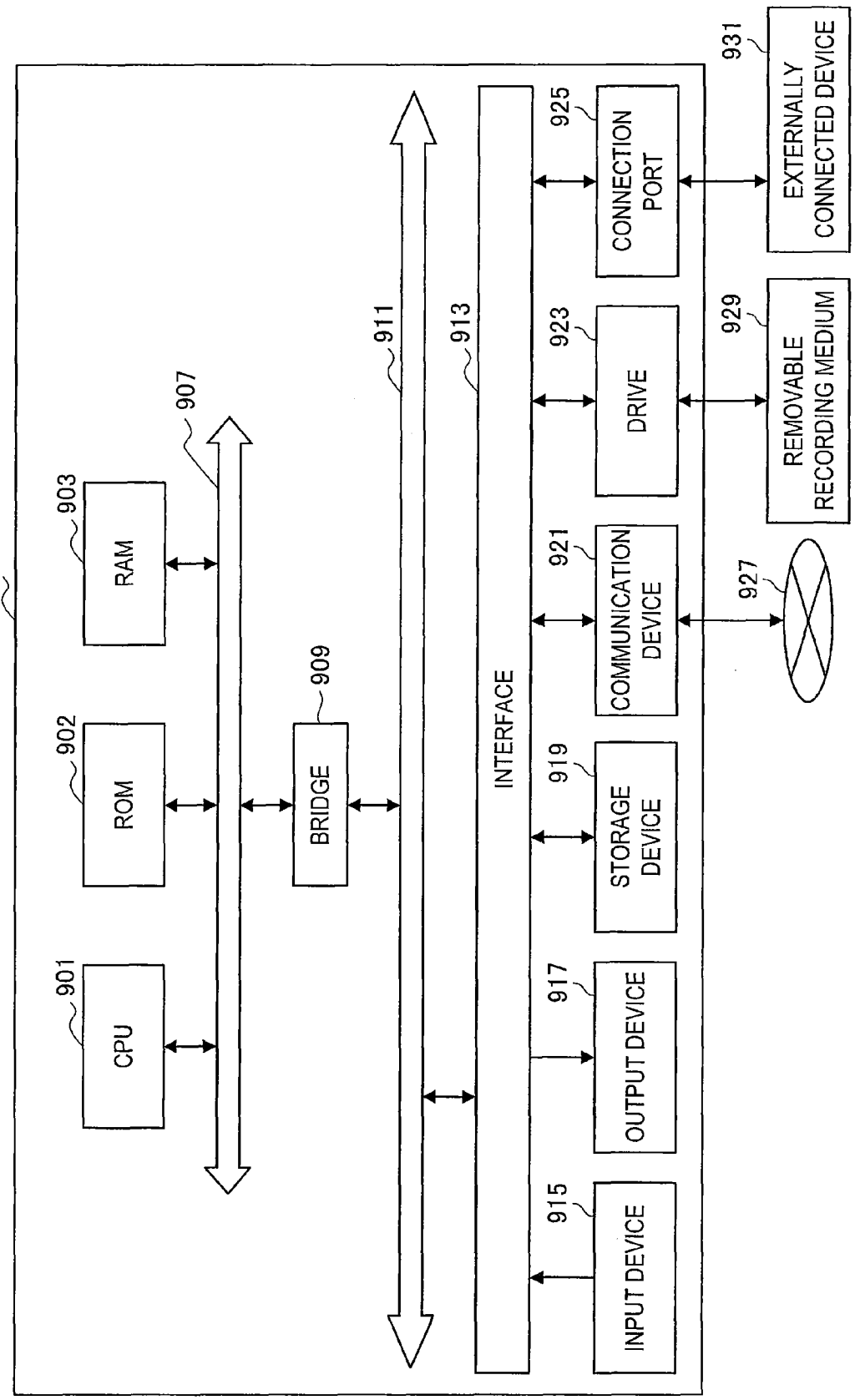

INFORMATION PROCESSING DEVICE, INFORMATION PROCESSING CLIENT, ACCESS AUTHENTICATION METHOD, AND PROGRAM

CROSS REFERENCE TO RELATED APPLICATIONS

This application claims the benefit of Japanese Priority Patent Application JP 2012-229218 filed Oct. 16, 2012, the entire contents of which are incorporated herein by reference.

BACKGROUND

The present disclosure relates to an information processing device, an information processing client, an access authentication method, and a program.

In a system where a given area of a given object of access is shared by multiple users as an access area, various security measures are typically implemented to manage the shared access area.

For example, Japanese Unexamined Patent Application Publication No. 2005-209181 discloses a file management system in a system in which files saved on a shared file server are shared by multiple users. The file management system is able to improve the security level of file management by using a secret key to encrypt files with a secret key encryption scheme, and additionally encrypt the secret key using a public key.

As another example, Japanese Unexamined Patent Application Publication No. 2010-244432 discloses a file sharing system in a similar system in which files saved on a shared file server are shared by multiple users. Encrypted files in the file sharing system are decrypted by conducting user attribute authentication using user attribute information such as a user's name and date of birth.

SUMMARY

In a sharing system, various types of objects of access and access areas may exist, both tangible and intangible. Consequently, high safety is demanded of the management technique, according to the importance of the objects of access and access areas.

Consequently, there is still room for improvement in the security measures implemented in the above Japanese Unexamined Patent Application Publication No. 2005-209181 and Japanese Unexamined Patent Application Publication No. 2010-244432. For example, although the technology described in Japanese Unexamined Patent Application Publication No. 2005-209181 discloses technology that encrypts files, there is no discussion of authenticating the attributes of a user attempting to access such files. As another example, the technology described in Japanese Unexamined Patent Application Publication No. 2010-244432 merely encourages the use of existing methods with regard to the safety of the user attribute authentication itself.

In light of the above circumstances, it is desirable to realize higher safety of access area management in a sharing system. Accordingly, the present disclosure proposes a new and improved information processing device, information processing client, access authentication method, and program able to further raise safety in a sharing system.

According to an embodiment of the present disclosure, there is provided an information processing device including a public key setter that sets a public key corresponding to a public-key authentication scheme in an access area defined as a given area of an object of access, and a device authentication processor that authenticates access to the access area against a secret key paired with the public key.

Further, according to an embodiment of the present disclosure, there is provided an information processing client including a client authentication processor that is authenticated for access to an access area defined as a given area of an object of access in an external device, and set with a public key that corresponds to a public-key authentication scheme and pairs with a secret key.

Further, according to an embodiment of the present disclosure, there is provided an access authentication method including setting a public key corresponding to a public-key authentication scheme in an access area defined as a given area of an object of access, and authenticating access to the access area against a secret key paired with the public key.

Further, according to an embodiment of the present disclosure, there is provided a program causing a computer to realize the functions of setting a public key corresponding to a public-key authentication scheme in an access area defined as a given area of an object of access, and authenticating access to the access area against a secret key paired with the public key.

As described above, according to an embodiment of the present disclosure, a public key setter sets a public key corresponding to a public-key authentication scheme in an access area defined as a given area of an object of access. In addition, a device authentication processor authenticates access to the access area against a secret key paired with the public key.

Also, as described above, according to an embodiment of the present disclosure, a client authentication processor is authenticated for access to an access area defined as a given area of an object of access in an external device, and which is set with a public key that corresponds to a public-key authentication scheme and pairs with a secret key.

According to an embodiment of the present disclosure as described above, it becomes possible to further raise safety in a sharing system.

BRIEF DESCRIPTION OF THE DRAWINGS

FIG. 3A is a schematic diagram illustrating an example of an access authentication process according to an embodiment of the present disclosure;

FIG. 3B is a schematic diagram illustrating an example of an access authentication process according to an embodiment of the present disclosure;

FIG. 3D is a schematic diagram illustrating an example of an access authentication process according to an embodiment of the present disclosure;

FIG. 7 is a sequence diagram illustrating an example of a processing sequence in an access authentication processing method according to an embodiment of the present disclosure;

FIG. 9 is a block diagram for explaining a hardware configuration of an information processing device and an information processing client according to an embodiment of the present disclosure;

DETAILED DESCRIPTION OF THE EMBODIMENT(S)

Figure 1:
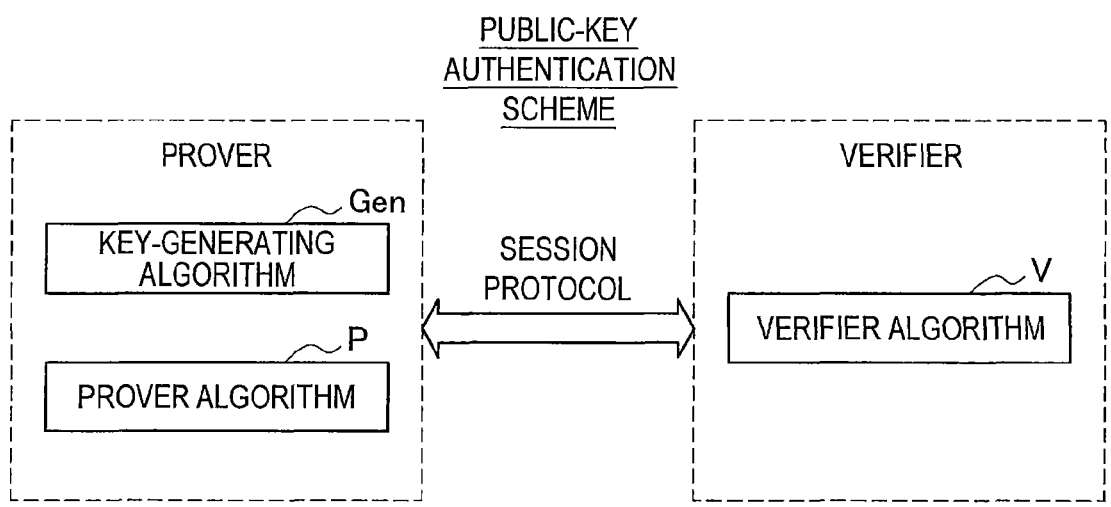
FIG. 1 is an explanatory diagram summarizing algorithms for a public-key authentication scheme.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Hereinafter, the description will proceed in the following order.

1. Overview of public-key authentication schemes
1-1. Algorithms for public-key authentication scheme
1-2. N-pass public-key authentication scheme
2. Overview of access authentication process
3. Device function and configuration
3-1. Server
3-2. User client
4. Processing sequence of access authentication process
5. Exemplary modifications
6. Hardware configuration
7. MQ authentication scheme
7-1. Example of specific algorithm structures
7-2. Example of parallelized algorithm structures
8. Conclusion

1. Overview of Public-Key Authentication Schemes

In an embodiment of the present disclosure, authentication using a public-key authentication scheme is conducted to provide access to an access area defined as a given area of an object of access in a sharing system. In the following description, such an authentication process according to an embodiment of the present disclosure is called an access authentication process. Before describing an access authentication process according to an embodiment of the present disclosure, first, an overview of public-key authentication schemes will be given in this section.

[1-1. Algorithms for Public-Key Authentication Scheme]

First, algorithms for a public-key authentication scheme will be summarized with reference to FIG. 1. FIG. 1 is an explanatory diagram algorithm for public-key authentication scheme.

Public-key authentication is used in order for a certain person (the prover, also referred to as Alice) to convince another person (the verifier, also referred to as Bob) that she is herself by using a public key PK and a secret key SK. For example, Alice's public key $PK_A$ is disclosed to Bob. On the other hand, Alice keeps her secret key $SK_A$ a secret. In the public-key authentication setup, it is assumed that Alice herself is the person who knows the secret key $SK_A$ corresponding to the public key $PK_A$. Note that in the following description, possessive relationships of the public key PK and the secret key SK will be indicated by appending letters to the end of the public key PK and the secret key SK as above. For example, a public key PK possessed by Alice is designated the public key $PK_A$, and a secret key SK possessed by Alice is designated the secret key $SK_A$.

In order for Alice to prove to Bob that she is Alice herself using the public-key authentication setup, Alice, via a session protocol, presents proof to Bob indicating that she knows the secret key $SK_A$ corresponding to the public key $PK_A$. The proof indicating that Alice knows the secret key $SK_A$ is then presented to Bob, and in the case where Bob is able to confirm that proof, the validity of Alice (the fact that Alice is herself) is proven.

However, a public-key authentication setup demands the following conditions in order to ensure safety.

The first condition is that a forger who does not possess the secret key SK when executing the session protocol has a vanishingly small probability of creating a forgery. Upholding the first condition is called "soundness". In other words, soundness may be restated as: "a forger lacking a secret key SK has a negligible chance of establishing a forgery during the session protocol." The second condition is that no information about Alice's secret key $SK_A$ is divulged to Bob, even if executing the session protocol. Upholding the second condition is called "zero-knowledge".

Conducting public-key authentication safely involves using a session protocol exhibiting both soundness and zero-knowledge. If an authentication process were hypothetically conducted using a session protocol lacking soundness and zero-knowledge, there would be a definite chance of false verification and a definite chance of the divulgence of secret key information, and thus the validity of the prover would not be proven even if the process itself is completed successfully. Consequently, the question of how to ensure the soundness and zero-knowledge of a session protocol is important.

(Model)

As illustrated in FIG. 1, the two identities of prover and verifier exist in a model of a public-key authentication scheme. The prover uses a key-generating algorithm Gen to generate a paired secret key SK and public key PK unique to the prover. Subsequently, the prover uses the paired secret key SK and public key PK generated using the key-generating algorithm Gen to execute a session protocol with a verifier. At this point, the prover executes the session protocol by using a prover algorithm P. As above, the prover uses the prover algorithm P to present proof that she possesses the secret key SK to the verifier during the session protocol.

Meanwhile, the verifier executes the session protocol using a verifier algorithm V, and verifies whether or not the prover possesses the secret key corresponding to the public key made public by that prover. In other words, the verifier is an entity that verifies whether or not the prover possesses the secret key that corresponds to the public key. In this way, the model of a public-key authentication scheme is made up of the two entities of the prover and the verifier, and the three algorithms of the key-generating algorithm Gen, the prover algorithm P, and the verifier algorithm V.

Note that although the foregoing description and the following description use terms such as "prover", "verifier", "Alice", and "Bob", these terms may mean entities. Consequently, the agent that executes the key-generating algorithm Gen and the prover algorithm P may be an information processing device (information processing client) corresponding to the "prover" entity. Similarly, the agent that executes the verifier algorithm V may be an information processing device (information processing client). Furthermore, the agent that conducts various processes related to an access authentication process according to the embodiment hereinafter discussed may be an information processing device (information processing client). The hardware configuration of these information processing devices (information processing clients) is as illustrated in FIG. 9, for example. In other words, the key-generating algorithm Gen, the prover algorithm P, and the verifier algorithm V are executed by a device such as a CPU 901 on the basis of a program recorded onto a device such as ROM 903, RAM 905, a storage device 919, or a removable recording medium 929.

(Key-Generating Algorithm Gen)

The key-generating algorithm Gen is used by the prover. The key-generating algorithm Gen is an algorithm that generates a paired secret key SK and public key PK unique to the prover. The public key PK generated by the key-generating algorithm Gen is made public. The public key PK thus made public is then used by the verifier. Meanwhile, the prover keeps the secret key SK generated by the key-generating algorithm Gen a secret. The secret key SK kept secret by the prover is then used to prove to the verifier that the prover possesses the secret key SK corresponding to the public key PK. Formally, the key-generating algorithm Gen is expressed as an algorithm like the following Eq. 1, which accepts a security parameter $1^\lambda$ (where λ is an integer equal to or greater than 0) as input, and outputs a secret key SK and a public key PK.

$$(SK, PK) \leftarrow \text{Gen}(1^\lambda) \tag{1}$$

(Prover Algorithm P)

The prover algorithm P is used by the prover. The prover algorithm P is an algorithm for proving to the verifier that the prover possesses the secret key SK corresponding to the public key PK. In other words, the prover algorithm P is an algorithm that accepts a secret key SK and a public key PK as input, and executes a session protocol.

(Verifier Algorithm V)

The verifier algorithm V is used by the verifier. The verifier algorithm V is an algorithm that verifies whether or not the prover possesses the secret key SK corresponding to the public key PK during the session protocol. The verifier algorithm V is an algorithm that accepts a public key PK as input, and outputs 0 or 1 (1 bit) according to the execution results of the session protocol. At this point, the verifier decides that the prover is invalid in the case where the verifier algorithm V outputs 0, and decides that the prover is valid in the case where the verifier algorithm V outputs 1. Formally, the verifier algorithm V is expressed as in the following Eq. 2.

$$0/1 \leftarrow V(PK) \tag{2}$$

As above, realizing meaningful public-key authentication involves having the session protocol satisfy the two conditions of soundness and zero-knowledge. However, proving that the prover possesses the secret key SK involves the prover executing a procedure dependent on the secret key SK, and after notifying the verifier of the result, causing the verifier to execute verification based on the content of the notification. The procedure dependent on the secret key SK is executed to ensure soundness. At the same time, no information about the secret key SK should be revealed to the verifier. For this reason, the above key-generating algorithm Gen, prover algorithm P, and verifier algorithm V are skillfully designed to satisfy these requirements.

[1-2. N-Pass Public-Key Authentication Scheme]

Figure 2:
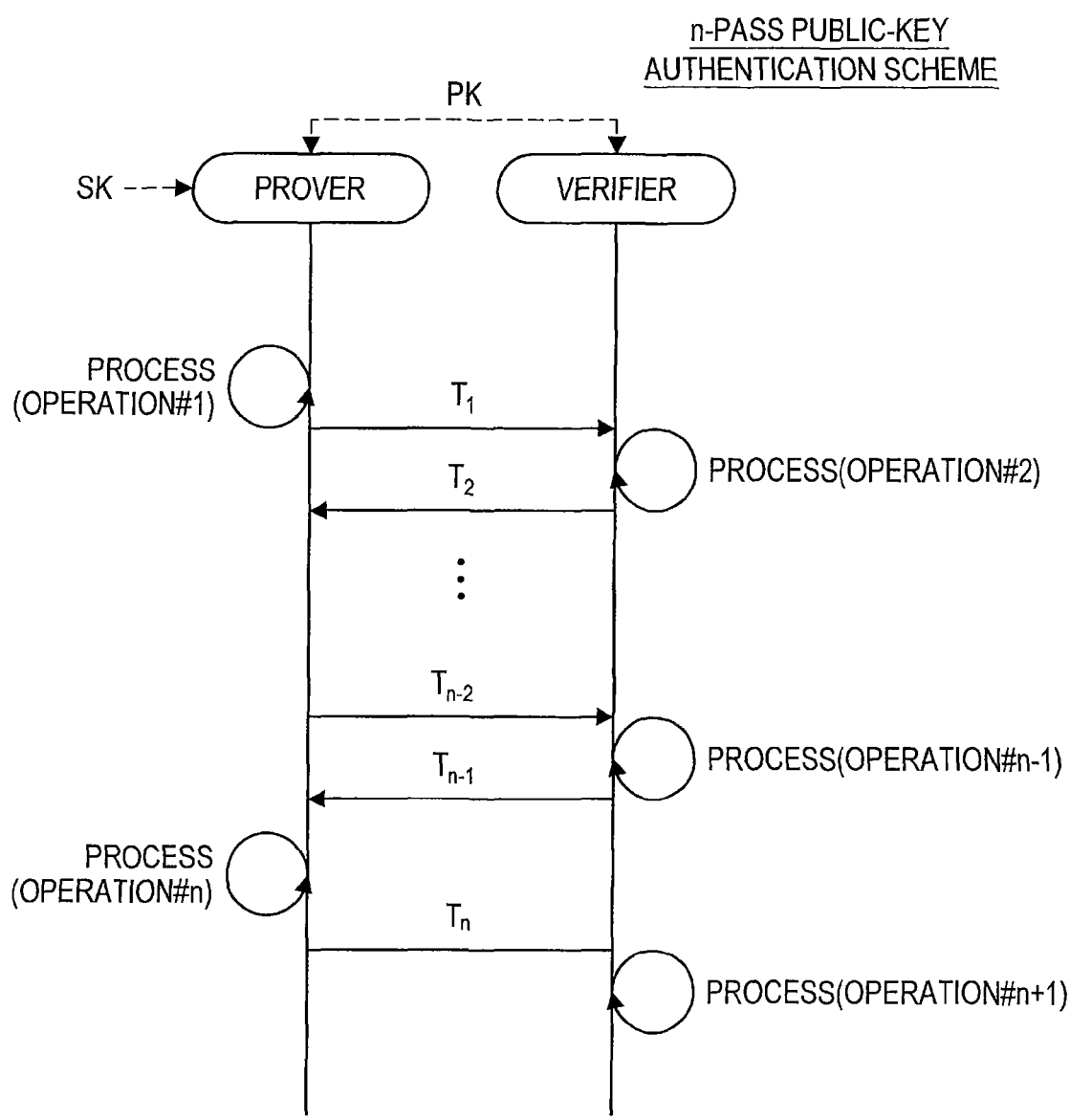
FIG. 2 is an explanatory diagram summarizing algorithms for an n-pass public-key authentication scheme.

Next, an n-pass public-key authentication scheme will be described with reference to FIG. 2. FIG. 2 is an explanatory diagram illustrating an n-pass public-key authentication scheme.

As above, a public-key authentication scheme is an authentication scheme that proves to a verifier that a prover possesses a secret key SK corresponding to a public key PK during a session protocol. In addition, the session protocol has to satisfy the two conditions of soundness and zero-knowledge. For this reason, during the session protocol both the prover and the verifier exchange information n times while executing respective processes, as illustrated in FIG. 2.

In the case of an n-pass public-key authentication scheme, the prover executes a process using the prover algorithm P (operation #1), and transmits information $T_1$ to the verifier. Subsequently, the verifier executes a process using the verifier algorithm V (operation #2), and transmits information $T_2$ to the prover. This execution and processes and transmission of information $T_k$ is successively conducted for k=3 to n, and lastly, a process (operation #n+1) is executed. Transmitting and receiving information n times in this way is thus called an "n-pass" public-key authentication scheme.

The foregoing thus gives an overview of public-key authentication schemes with reference to FIGS. 1 and 2. Note that well-established types of public-key authentication schemes include the RSA scheme, which bases its safety on the difficulty of prime factorization for large composite numbers, and the ECC scheme, which bases its safety on the difficulty of deriving a solution to the problem of finding the discrete logarithm of an elliptic curve, for example.

In an access authentication process according to the present embodiment, the type of public-key authentication scheme to apply is not particularly limited, and public-key authentication of any kind may be applied. For example, the above RSA scheme or ECC scheme may be used as the public-key authentication scheme in an access authentication process according to the present embodiment. As another example, an access authentication process according to the present embodiment may use, as the public-key authentication scheme, authentication schemes that base their safety on the difficulty of solving high-order, multi-variate systems of equations, including the MQ authentication scheme described in detail in the later section <7. MQ authentication scheme>.

2. Overview of Access Authentication Process

Next, an overview of an access authentication process according to an embodiment of the present disclosure using a public-key authentication scheme described above will be described. Note that in this section and the subsequent sections <3. Device function and configuration> and <4.

Processing sequence of access authentication process>, a data sharing system provided by an online storage service will be described as an example of a sharing system. However, a sharing system according to an embodiment of the present disclosure is not limited to such an example, and may also be any other type of sharing system. Additionally, in a data sharing system provided by an online storage service, the term "access" may refer to various processes capable of processing electronic data being stored in a data area. The various processes capable of processing electronic data may refer to at least one of a viewing process, an editing process, a reading process, a writing process, and an executing process.

In an online storage service, a data area in cloud storage is assigned and provided to a user, for example. The user is able to store various data (files and folders) in the data area assigned to oneself. Additionally, the user is able to set, within the data area assigned to oneself, an area able to be shared with and edited by other users, or an area able to be viewed by other users.

At this point, in a typical online storage service, it is possible for just specific users from among the registered members of the same service to grant each other data viewing permissions or editing permissions by specifying each other's user IDs, for example. On the other hand, sharing data with a user who is not registered for the same service may involve informing that user of a URL indicating the location of a folder where data to be shared is stored. In this case, however, anyone capable of ascertaining that URL becomes able to access the data, and this mechanism becomes insufficient as a security measure when handling important data.

By applying an access authentication process according to the present embodiment to such a data sharing system provided by an online storage service, it becomes possible to more safely manage data held in storage. Hereinafter, an overview of this application will be described with reference to FIGS. 3A to 3D. FIGS. 3A to 3D are schematic diagrams illustrating an example of an access authentication process according to an embodiment of the present disclosure.

Referring to FIG. 3A, a user A is able to access a server 10 via a network 300, for example. The server 10 is a server that includes storage adapted to an online storage service, for example, and is able to provide a user whose uses that online storage service with a given area in a data area 150 in the storage. Note that the server 10 corresponds to an information processing device in the description given in the above section <1. Overview of public-key authentication schemes> and in the description hereinafter.

In the example illustrated in FIG. 3A, a partial area of the data area 150 included in the server 10 is provided to the user A as the user A's area 160. The user A is able to store desired data, such as various files and folders, for example, in the user A's area 160.

Figure 3C:
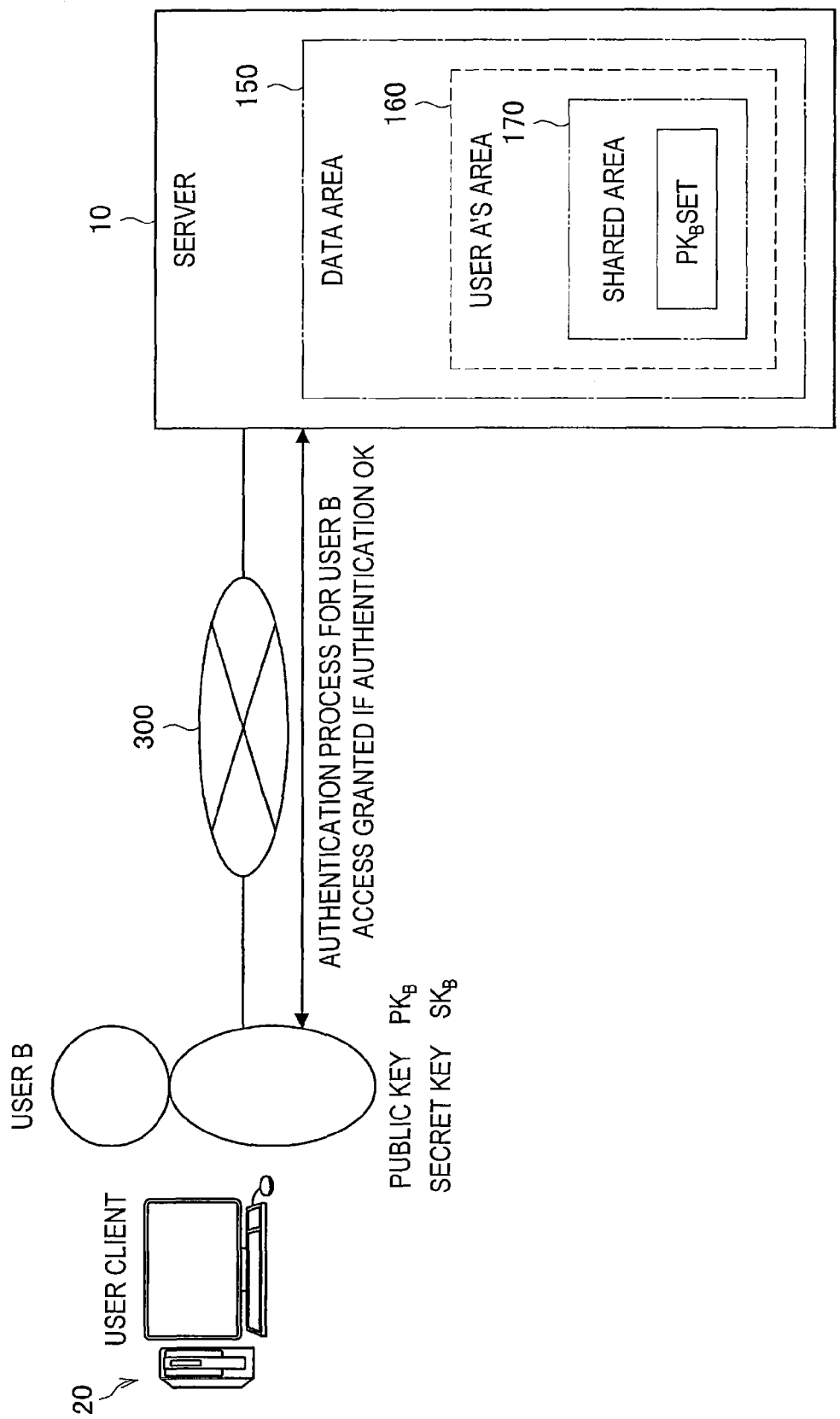
FIG. 3C is a schematic diagram illustrating an example of an access authentication process according to an embodiment of the present disclosure.

Note that for the sake of simplicity, in FIG. 3A as well as in the subsequent FIGS. 3B, 3C, and 3D, only the data area of the memory medium represented as storage, for example, is conceptually illustrated as part of the configuration of the server 10, while the rest of the configuration is reduced or omitted from illustration. The schematic configuration of the server 10 and the function of each structural element will be described in detail later in section <3. Device function and configuration>. Also, a hardware configuration of the server 10 will be described in detail later in section <6. Hardware configuration>.

Additionally, referring to FIG. 3B, the user A is able to set a given area in the user A's area 160 as a shared area 170, in which data may be shared with other users. However, in the access authentication process according to the present embodiment, when setting the shared area 170, the user A is able to restrict which users are able to access the shared area 170.

As a specific example, consider the case where the user A sets a shared area 170 such that another user B is able to access the shared area 170, for example. In this case, the user B possesses a public key $PK_B$ and a secret key $SK_B$ in advance. These keys are a combination of a public key and a secret key corresponding to a given public-key authentication scheme. Herein, the method of creating a public key and a secret key corresponding to a public-key authentication scheme is not particularly limited, and a public key and secret key may be created using existing, established tools.

Furthermore, from between the public key $PK_B$ and the secret key $SK_B$, the user B informs the user A of the public key $PK_B$ in advance. Note that the way of informing the user A of the public key $PK_B$ in advance is not particularly limited, and any communication mechanism may be used, such as writing, email, or speech, for example.

In order to enable the user B to access the shared area 170, the user A sets the communicated public key $PK_B$ of the user B in the shared area 170. Herein, a specific method of setting the public key $PK_B$ will be described in detail in the section [3-1. Server] below.

Additionally, as illustrated in FIG. 3C, a user client 20 able to bidirectionally communicate with the server 10 via the network 300 is connected to the server 10, for example. Note that the user client 20 corresponds to an information processing client in the description given in the above section <1. Overview of public-key authentication schemes> and in the description hereinafter.

For example, information about the secret key $SK_B$ is saved in the user client 20, and when the user B attempts to access the shared area 170, an authentication process using a public-key authentication scheme is conducted between the server 10 and the user client 20 on the public key $PK_B$ set in the shared area 170 and the secret key $SK_B$ saved in the user client 20. Subsequently, if the result of the authentication process is positive, access to the shared area 170 from the user client 20 is granted.

In addition, in the access authentication process according to the present embodiment, multiple differing public keys may be set in the shared area 170. For example, as illustrated in FIG. 3D, the user A is able to set both a public key $PK_B$ possessed by a user B and a public key $PK_C$ possessed by a user C in the shared area 170. In the case where the public key $PK_B$ and the public key $PK_C$ are both set in the shared area 170, an authentication process using a public-key authentication scheme is conducted for the user B on the public key $PK_B$ set in the shared area 170 and a secret key $SK_B$ saved in a user client 20, and the user B is authenticated to access the shared area 170. Meanwhile, an authentication process using a public-key authentication scheme is similarly conducted for the user C on the public key $PK_C$ set in the shared area 170 and a secret key $SK_C$ saved in a user client 20, and the user C is authenticated to access the shared area 170.

Thus, as described above with reference to FIGS. 3A to 3D, in the present embodiment, in an access authentication process for a sharing system, a public key corresponding to a public-key authentication scheme is set in an access area defined as a given area of an object of access, and access to the access area is authenticated against a secret key paired with that public key. Consequently, it becomes possible to further raise safety in a sharing system.

Additionally, an access authentication process according to the present embodiment may be suitably applied to a data sharing system using an online storage service, for example. Specifically, as described with reference to FIGS. 3A to 3D, in the case where the sharing system is a data sharing system using an online storage service, the object of access may be a data area assigned to a particular user from among data areas in the storage, and the access area may be a further given data area (shared area) in the data area assigned to the particular user. By setting a public key corresponding to a public-key authentication scheme in the shared area, and authenticating access to the shared area against a secret key paired with the public key, management of various data stored in the shared area is conducted more safely.

Note that FIGS. 3A to 3D give an example of an online storage service as an example of an access authentication process according to the present embodiment, and are used to describe a case in which the object of access is a user A's area 160 defined as a given area in a data area 150 of the storage, and the access area is a shared area 170 defined as a given area in the user A's area 160. However, in a data sharing system using an online storage service, the association between the object of access and the access area is not limited to such an embodiment. For example, it is also possible to treat the data area 150 of the storage as the object of access, and treat a user A's area 160 defined as a given area in the data area 150 as the access area. In the case where the object of access is a data area 150 of the storage and the access area is a user A's area 160, a public key $PK_A$ from between a public key $PK_A$ and a secret key $SK_A$ possessed by the user A and corresponding to a public-key authentication scheme may be set in the user A's area 160. In the case where the public key $PK_A$ is set in the user A's area 160, when the user A attempts to access the user A's area 160, an authentication process using a public-key authentication scheme may be conducted on the public key $PK_A$ set in the user A's area 160 and the secret key $SK_A$ possessed by the user A.

Furthermore, the sharing system to which is applied an access authentication process according to the present embodiment is not limited to a sharing system using an online storage service. A specific example of a sharing system other than a sharing system using an online storage service will be later described in detail in the section <5. Exemplary modifications> below.

3. Device Function and Configuration

Next, an exemplary configuration of an information processing device and an information processing client according to an embodiment of the present disclosure will be described. Note that this section describes an exemplary configuration of an information processing device and an information processing client according to the present embodiment by taking a data sharing system provided by an online storage service as an example of a sharing system.

[3-1. Information Processing Device (Server)]

Figure 4:
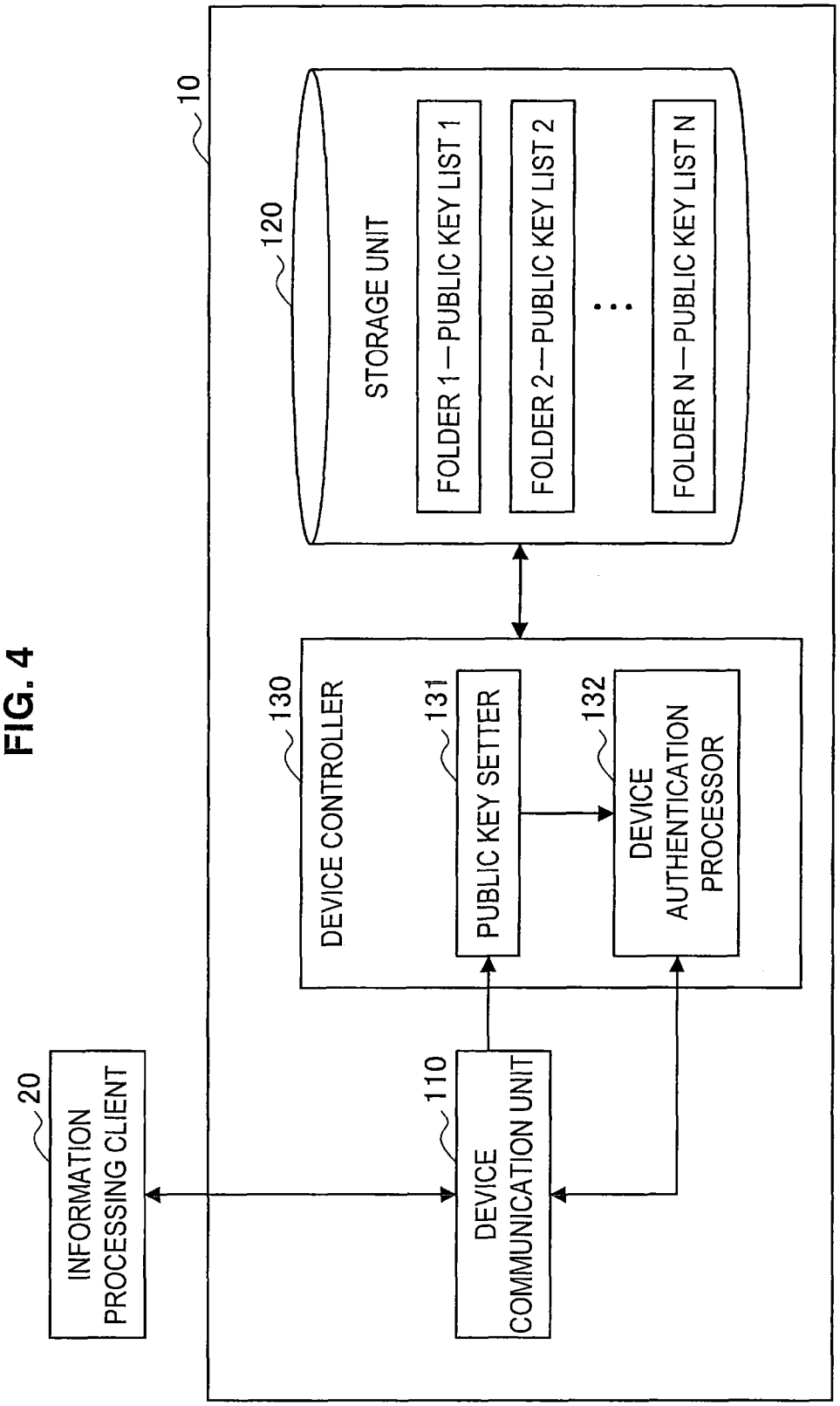
FIG. 4 is a function block diagram illustrating a schematic configuration of an information processing device according to an embodiment of the present disclosure.

First, an exemplary configuration of an image processing device according to an embodiment of the present disclosure will be described with reference to FIG. 4. FIG. 4 is a function block diagram illustrating a schematic configuration of an information processing device according to an embodiment of the present disclosure. Note that in the present embodiment, an information processing device is called a server. In other words, an information processing device according to the present embodiment corresponds to a server in the description given in the above section <2. Overview of access authentication process> and in the description hereinafter.

Referring to FIG. 4, a server 10 (information processing device 10) according to the present embodiment is equipped with a device communication unit 110, a storage unit 120, and a device controller 130.

The device communication unit 110 is an interface for communicably connecting the server 10 and various external devices to each other via a given communication network, for example. Specifically, in the present embodiment, the device communication unit 110 communicably connects the server 10, the user client 20, and/or another given client to each other via a given network. For example, the server 10 is able to receive a public key PK to be set in a given area in a data area of the storage unit 120 from a given client via the device communication unit 110 and the network. As another example, the server 10 is able to receive an access request with respect to data set with a public key PK from the user client 20 via the device communication unit 110 and the network. Additionally, the server 10 is able to bidirectionally exchange various information related to a public-key authentication process with the user client 20 via the device communication unit 110 and the network, for example. Note that the various information related to a public-key authentication process may be information such as the information $T_1$ and $T_2$ in the session protocol described in the above section <1. Overview of public-key authentication schemes>, for example.

The storage unit 120 is an example of a memory medium provided with a data area that is shared in a sharing system. As discussed earlier, the present embodiment is described by taking a data sharing system provided by an online storage service as an example of a sharing system, and thus given areas in a data area of the storage unit 120 are provided to given users as data areas for storing various data. The type of the storage unit 120 is not limited insofar as the storage unit 120 is a memory medium able to store electronic data, and may be realized by a magnetic memory device such as a hard disk drive (HDD), various semiconductor memory devices, or the like.

The device controller 130 controls overall operation of the server 10, while also processing various information related to an access authentication process according to the present embodiment. For example, the device controller 130 sets a public key corresponding to a public-key authentication scheme in an access area defined as a given area of an object of access. Specifically, in the case of the present embodiment, the device controller 130 sets a public key corresponding to a public-key authentication scheme in a given area in a data area of the storage unit 120.

As another example, the device controller 130 authenticates access to the access area against a secret key paired with the public key. Specifically, in the case of the present embodiment, the device controller 130 authenticates access to a data area set with the public key in the storage unit 120 against a secret key paired with the public key.

Hereinafter, the functions and configuration of the device controller 130 will be described in further detail. The device controller 130 includes a public key setter 131 and a device authentication processor 132, for example.

The public key setter 131 sets a public key corresponding to a public-key authentication scheme in an access area defined as a given area of an object of access. Specifically, in the case of the present embodiment, the public key setter 131 sets a public key received from a given client in a given area in a data area of the storage unit 120, for example.

In addition, in the access authentication process according to the present embodiment, the public key setter 131 may also set multiple differing public keys in a single access area. In the case where multiple differing public keys are set in a single access area, a public key list in which multiple public keys set in a particular access area are organized in list form, for example, may be saved in association with that access area. For example, the example illustrated in FIG. 4 illustrates a case in which access areas set with public keys are given areas in a data area of the storage unit 120, and additionally, the given areas are folders. Furthermore, FIG. 4 schematically illustrates how multiple folders are provided in the storage unit 120, and how multiple public keys are set as public key lists in each of the multiple folders "Folder 1", "Folder 2", and so on to "Folder N".

Herein, the multiple differing public keys set in an access area may be public keys that are respectively paired with secret keys possessed by multiple differing users, for example. As described in the above section <2. Overview of access authentication process>, in an access authentication process according to the present embodiment, the access authentication process for an access area is conducted between the public key set in that access area, and a secret key. For this reason, a user possessing a secret key paired with a public key set in an access area becomes able to access that access area. In other words, the public key setter 131 is able to control users' access to access areas, according to which public keys are set in which access areas.

Also, in the case where the access areas are electronic data stored in given areas in a data area of the storage unit 120, such as folders and/or files, the public key setter 131 may also individually set public keys with respect to each right included in the access rights to those folders and/or files. Herein, access rights may include at least one of writing rights and reading rights with respect to a folder and/or file. In addition, access rights may also include at least one of viewing rights, editing rights, and executing rights with respect to a folder and/or file. In other words, with respect to electronic data to be shared with multiple users, the public key setter 131 is able to grant different rights to each user as access rights to that electronic data.

Note that in the case where the access areas are folders provided in given areas in a data area of the storage unit 120, the public key setter 131 may also conduct the respective methods indicated below, for example, as specific methods of setting public keys in those folders.

For example, public keys may be set as folder attribute information. Specifically, with respect to a folder created in a data area of the storage unit 120, a function for setting a public key as a property of that folder may be provided, for example. By having a public key set from a folder's properties, the public key setter 131 may also set that public key in that folder.

As an example of another method, public keys may also be set in a hidden file inside a folder. A hidden file refers to a file that is ordinarily not displayed, and may be a configuration file for that folder, for example. Specifically, by writing information related to a public key in a hidden file, the public key setter 131 may also set that public key in that folder.

As an example of yet another method, public keys may also be set in the folder name. Specifically, the folder name may be configured to include a string corresponding to a public key. In other words, by including a string corresponding to a public key in the folder name, the public key setter 131 may set that public key in that folder.

Figure 5A:
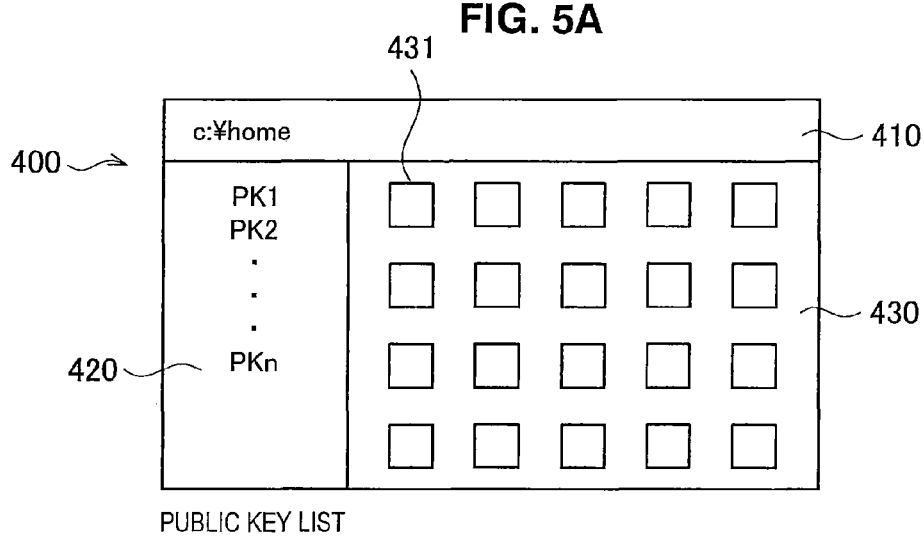
FIG. 5A is a diagram for explaining a method of setting a public key in a folder.
Figure 5B:
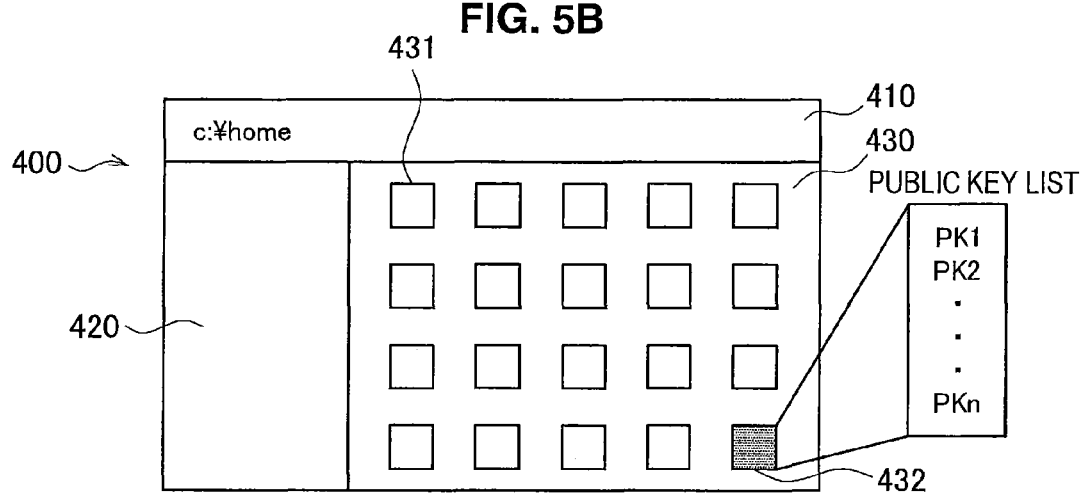
FIG. 5B is a diagram for explaining a method of setting a public key in a folder.
Figure 5C:
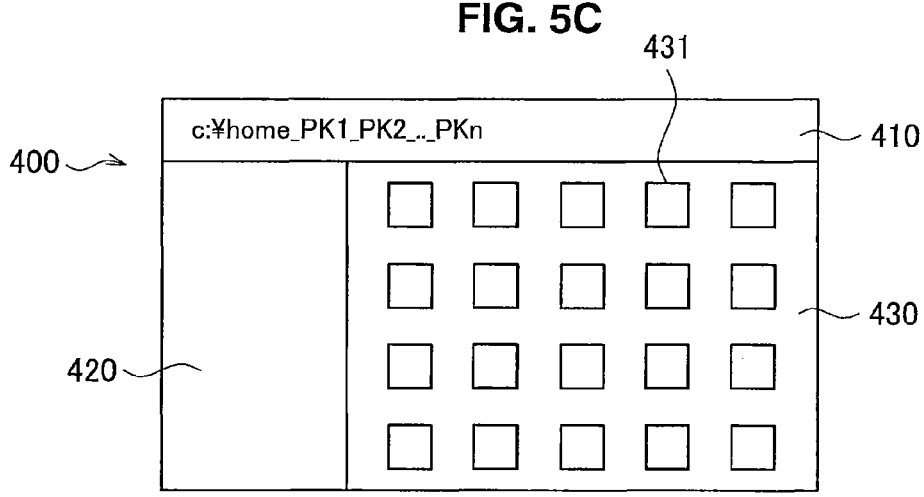
FIG. 5C is a diagram for explaining a method of setting a public key in a folder.

The specific methods for setting public keys in a folder described above will now be described in detail with reference to FIGS. 5A to 5C. FIGS. 5A to 5C are diagrams for explaining methods of setting public keys in a folder.

FIGS. 5A to 5C illustrate display examples of windows displayed on a display screen of a later-discussed client display unit 230 of the user client 20 (information processing client), for example, when viewing files stored in a folder. Referring to FIGS. 5A to 5C, a window 400 is made up of a folder name display field 410, a sub window 420, and a main window 430.

Displayed in the folder name display field 410 is the path and folder name of the folder being viewed, for example. In the examples illustrated in FIGS. 5A to 5C, information such as "C:¥home", for example, is displayed in the folder name display field 410 as the path and folder name of the folder.

Also, attribute information of the folder being viewed is displayed in the sub window 420, for example. The attribute information of a folder may include information such as the name of the folder, the data size of the folder, the creation date and time of the folder, and the location (path) of the folder, for example.

Also, data being stored in the folder being viewed (files, for example) are displayed as icons in the main window 430, for example. A user is able to check the data being stored in the folder by referring to the icons displayed in the main window 430.

First, the method in which public key are set as folder attribute information will be described with reference to FIG. 5A. Referring to FIG. 5A, public keys PK1, PK2, . . . , PKn set in a folder "home" are displayed in the sub window are attribute information for the folder "home". In this way, public keys set as attribute information may be displayed in the sub window 420 as a list.

Next, the method in which public keys are set in a hidden file inside a folder will be described with reference to FIG. 5B. Referring to FIG. 5B, a hidden file 432 is displayed together with other files 431 in the main window 430. Information related to public keys PK1, PK2, . . . , PKn may be stated inside the hidden file 432, for example. Note that the hidden file may be arbitrarily switched between being displayed or hidden on the display screen by a user, and may be set to hidden by default.

Next, the method in which public keys are set in the folder name will be described with reference to FIG. 5C. Referring to FIG. 5C, "C: ¥home_PK1_PK2_ . . . _PKn" is displayed in the folder name display field 410 as the path and folder name of the folder. Herein, the displayed information such as "PK1", "PK2", and "PKn" in the displayed "C: ¥home_PK1_PK2_ . . . _PKn" may be strings that respectively correspond to public keys PK1, PK2, and PKn. In this way, public keys set in the folder name may be displayed in the folder name display field 410 as the folder name.

Returning to FIG. 4, the description of the configuration and functions of the device controller 130 will now continue.

The device authentication processor 132 authenticates access to an access area against a secret key paired with a public key set in that access area. Specifically, the device authentication processor 132 receives an access request for a given access area that is transmitted from a user client 20 via the device communication unit 110, for example. Upon receiving the access request, the device authentication processor 132 conducts an authentication process using a public-key authentication scheme between a public key set in the access area requested for access, and a secret key possessed by the user client 20 that issued the access request. If the result of the public-key authentication process is positive, the device authentication processor 132 permits the user client 20 that issued the access request to access the access area requested for access.

More specifically, in the case of the example illustrated in FIG. 4, for example, the access area may be any of multiple folders provided in a given area in a data area of the storage unit 120. For example, the device authentication processor 132 receives an access request for one of these multiple folders that is transmitted from the user client 20. Then, upon receiving the access request, the device authentication processor 132 conducts an authentication process using a public-key authentication scheme between a public key included in a public key list set in the folder requested for access, and a secret key possessed by the user client 20 that issued the access request. If the result of the public-key authentication process is positive, the device authentication processor 132 permits the user client 20 that issued the access request to access the folder requested for access.

Note that during the public-key authentication process, the device authentication processor 132 of the server 10 and a later-discussed client authentication processor 242 of the user client 20 exchange a series of information related to the public-key authentication process. The exchange of a series of information related to the public-key authentication process may be the exchange of information such as the information $T_1$ and $T_2$ in the session protocol described in the above section <1. Overview of public-key authentication schemes>, for example.

Note that although FIG. 4 omits the functions and configuration included in the device controller 130 other than those related to an access authentication process according to the present embodiment, the device controller 130 additionally may be equipped with various functions and configuration elements for causing the server 10 to function as an online storage server established in the related art. For example, the device controller 130 may additionally include a function that respectively assigns given areas in a data area of the storage unit 120 to multiple given users. Also, the device controller 130 may additionally include a function that stores various data in the data areas assigned to respective users.

Also, although omitted from illustration in FIG. 4, the server 10 may be additionally equipped with various functions and configuration elements included in an online storage server established in the related art. For example, the server 10 may be additionally equipped with device memory, separate from the storage unit 120, that stores various information used in various processes by the device controller 130, as well as the results of various processes by the device controller 130. As another example, the server 10 may be additionally equipped with a device input unit used to input various information and instructions into the server 10.

[3-2. Information Processing Client (User Client)]

Figure 6:
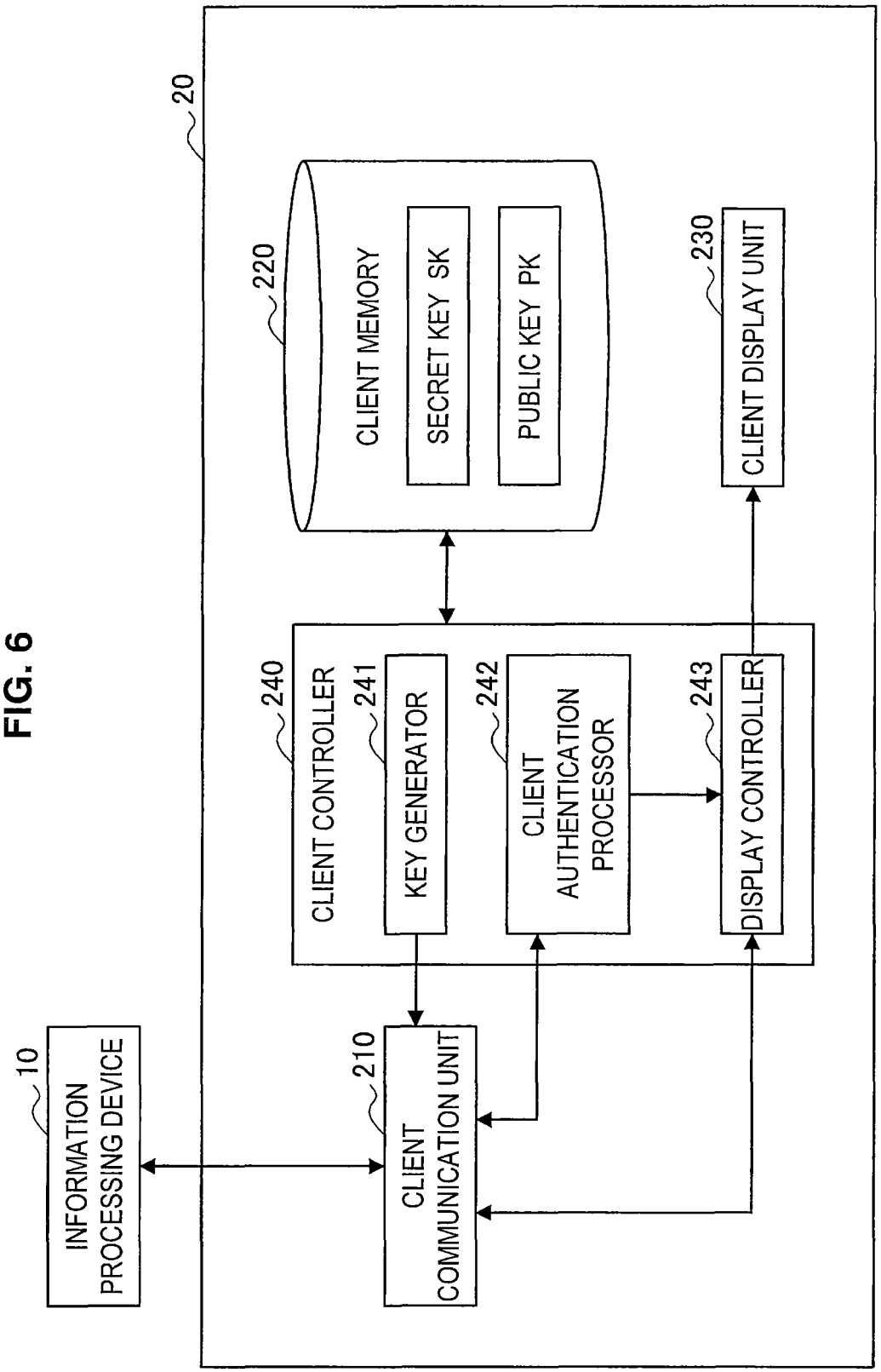
FIG. 6 is a function block diagram illustrating a schematic configuration of an information processing client according to an embodiment of the present disclosure.

Next, an exemplary configuration of an image processing client according to an embodiment of the present disclosure will be described with reference to FIG. 6. FIG. 6 is a function block diagram illustrating a schematic configuration of an information processing client according to an embodiment of the present disclosure. Note that in the present embodiment, an information processing client is called a user client. In other words, an information processing client according to the present embodiment corresponds to a user client in the description given in the above section <2. Overview of access authentication process> and in the description hereinafter.

Referring to FIG. 6, a user client 20 (information processing client 20) according to the present embodiment is equipped with a client communication unit 210, client memory 220, a client display unit 230, and a client controller 240.

The client communication unit 210 is an interface for communicably connecting the user client 20 and various external devices to each other via a given communication network, for example. Specifically, in the present embodiment, the client communication unit 210 communicably connects the user client 20 and the server 10 to each other via a given network. For example, via the client communication unit 210 and a network, the user client 20 is able to transmit to the server 10 an access request for a data area set with a public key from among the data areas of the storage unit 120 in the server 10. Additionally, the user client 20 is able to bidirectionally exchange various information related to a public-key authentication process with the server 10 via the client communication unit 210 and the network. Note that the various information related to a public-key authentication process may be information such as the information $T_1$ and $T_2$ in the session protocol described in the above section <1. Overview of public-key authentication schemes>, for example.

The client memory 220 is an example of a memory medium for storing various information processed by the user client 20. For example, the client memory 220 stores various information used in various processes by the client controller 240, as well as the results of various processes by the client controller 240. In the present embodiment, the client memory 220 stores a public key PK corresponding to a public-key authentication scheme, and a secret key SK paired with that public key PK, for example. As another example, the client memory 220 may also store various information related to a public-key authentication process that a later-discussed client authentication processor 242 of the client controller 240 exchanges with the device authentication processor 132 of the server 10.

The client display unit 230 includes a function that visually communicates various information to a user by displaying the information on a display screen under control by a display controller 243 discussed later. In the present embodiment, the client display unit 230 may also display information related to various data provided in a data area of the storage unit 120 in the server 10, such as files and folders, for example, on the display screen.

The client controller 240 controls overall operation of the user client 20, while also processing various information related to an access authentication process according to the present embodiment. For example, the client controller 240 generates a public key PK and a secret key SK, which are a combination of a public key and a secret key (a key pair) corresponding to a given public-key authentication scheme.

Also, the client controller 240 is authenticated for access to an access area defined as a given area of an object of access in an external device, and which is set with a public key PK that corresponds to a public-key authentication scheme and pairs with a secret key SK. Specifically, in the case of the present embodiment, by exchanging various information related to a public-key authentication process with the server 10, the client controller 240 is authenticated for access to a given area, set with a public key PK that pairs with a secret key SK, within a data area in the storage unit 120 of the server 10.

Hereinafter, a configuration and functions of the client controller 240 will be described in further detail. The client controller 240 includes a key generator 241, a client authentication processor 242, and a display controller 243, for example.

The key generator 241 generates a public key PK and a secret key SK, which are a combination of a public key and a secret key corresponding to a given public-key authentication scheme. Note that the method by which the key generator 241 generates a public key PK and a secret key SK corresponding to a public-key authentication scheme is not particularly limited, and a public key PK and secret key SK may be created using existing, established tools.

The client authentication processor 242 is authenticated for access to an access area defined as a given area of an object of access in an external device, and which is set with a public key PK that corresponds to a public-key authentication scheme and pairs with a secret key SK. Specifically, in the case of the present embodiment, by exchanging various information related to a public-key authentication process with the server 10, the client authentication processor 242 is authenticated against a secret key SK for access to a given area, set with a public key PK that pairs with the secret key SK, within a data area in the storage unit 120 of the server 10.

More specifically, in the case of the examples illustrated in FIGS. 4 and 6, for example, the access area may be any of multiple folders provided in a given area in a data area of the storage unit 120 in the server 10. For example, the client authentication processor 242 transmits an access request for one of these multiple folders to the server 10. Upon receiving the access request, the device authentication processor 132 of the server 10, by exchanging various information with the client authentication processor 242, conducts an authentication process using a public-key authentication scheme between a public key included in a public key list set in the folder requested for access, and a secret key possessed by the user client 20 that issued the access request. If the result of the public-key authentication process is positive, the client authentication processor 242 is authenticated for access to the folder requested for access.

Note that during the public-key authentication process, the device authentication processor 132 of the server 10 and the client authentication processor 242 of the user client 20 exchange a series of information related to the public-key authentication process. The exchange of a series of information related to the public-key authentication process may be the exchange of information such as the information T1 and T2 in the session protocol described in the above section <1. Overview of public-key authentication schemes>, for example.

The display controller 243 controls display functions in the client display unit 230, and causes various information to be displayed on a display screen of the client display unit 230. Specifically, the display controller 243 may cause information related to various data provided in a data area of the storage unit 120 in the server 10, such as files and folders, for example, on the display screen of the client display unit 230. Also, as discussed earlier, in a public-key authentication process, the user client 20 and the server 10 exchange various information. The display controller 243 may also cause an exchange of a series of information related to a public-key authentication process conducted between the client authentication processor 242 and the device authentication processor 132 of the server 10 to be displayed on the display screen of the client display unit 230.

Also, from among multiple access areas, the display controller 243 may cause only an access area set with a public key PK that pairs with a secret key SK corresponding to an authentication process by the client authentication processor 242 to be displayed on the display screen of the client display unit 230.

Specifically, the display controller 243 may cause only a folder set with a public key PK that pairs with a secret key SK corresponding to an authentication process by the client authentication processor 242 to be displayed on the display screen of the client display unit 230. More specifically, for multiple folders provided in a data area of the storage unit 120, for example, in some cases a public key $PK_B$ possessed by the user B may be set in some folders, but not set in other folders. In this case, when the user B connects to the server 10 from a particular user client 20 and attempts to view files and folders provided in a data area of the storage unit 120, the display controller 243 may cause only the folders set with the public key $PK_B$ to be displayed on the display screen of the client display unit 230. Note that the determination of whether or not a user who is connecting to the server 10 and attempting to view files and folders provided in a data area of the storage unit 120 is the user B may be determined by conducting user identification according to a login process or the like with respect to the user client 20, for example.

In this way, by causing only folders set with the public key $PK_B$ to be displayed on the display screen, for example, the user B is able to view only the folders that are accessible by the user B him- or herself Consequently, it is possible to improve usability for users.

The foregoing thus describes in detail an example of the functions of the server 10 and the user client 20 according to the present embodiment, and more particularly an example of the functions of the device controller 130 and the client controller 240. Note that each structural element of the server 10 and the user client 20 may be realized using general-purpose members or circuits, but may also be realized in hardware specialized in the function of each structural element. Also, for the device controller 130 and the client controller 240, the functions of each structural element may also be conducted entirely by a central processing unit (CPU) or the like. Consequently, it is possible to appropriately modify the configuration to be used according to the technological level at the time of carrying out the present embodiment.

Note that a hardware configuration of the server 10 and the user client 20 will be described in detail later in section <6. Hardware configuration>.

As described above, in a server 10 according to the present embodiment, a public key setter 131 sets a public key corresponding to a public-key authentication scheme in an access area defined as a given area of an object of access. Additionally, a device authentication processor 132 authenticates access to the access area against a secret key paired with the public key.

Meanwhile, in a user client 20 according to the present embodiment, a client authentication processor 242 is authenticated for access to an access area defined as a given area of an object of access in an external device, and which is set with a public key that corresponds to a public-key authentication scheme and pairs with a secret key. Herein, the external device may be the server 10 illustrated in FIG. 4, for example. Consequently, it becomes possible to further raise safety in a sharing system.

Note that although FIGS. 4 and 6 illustrate a situation in which a single server 10 and a single user client 20 are communicably connected to each other via a device communication unit 110 and a client communication unit 210, the present embodiment is not limited to such an example.

For example, multiple differing user clients 20 may also be connected to a single server 10. Also, multiple differing user clients 20 connected to a server 10 may possess respectively different key pairs of public keys PK and secret keys SK. Users are able to respectively connect to the server 10 from respective user clients 20, and in addition, be subjected to an access authentication process on the basis of respective key pairs of a public key PK and a secret key SK.

4. Processing Sequence of Access Authentication Process

Next, an access authentication processing method according to an embodiment of the present disclosure will be described with reference to FIG. 7. FIG. 7 is a sequence diagram illustrating an example of a processing sequence in an access authentication processing method according to an embodiment of the present disclosure. Note that this section describes a processing sequence of an access authentication process according to the present embodiment by taking a data sharing system provided by an online storage service as an example of a sharing system. A case in which a user A shares a given area in the user A's own data area assigned by the online storage service with another user B will be described as a specific example. Note that the application of an access authentication process according to the present embodiment is not limited to being a data sharing system provided by an online storage service, and may be another sharing system.

Note that since the functions of each structural element of the server 10 and the user client 20, such as the device communication unit 110, the public key setter 131, the device authentication processor 132, the client communication unit 210, the key generator 241, and the client authentication processor 242, for example, are described in the above section <3. Device function and configuration>, detailed description will be reduced or omitted herein.

Referring to FIG. 7, in an access authentication process according to the present embodiment, first, the user B (a user client 20) generates a public key $PK_B$ and a secret key $SK_B$, which are a combination of a public key and a secret key (a key pair) corresponding to a given public-key authentication scheme (step S701). The public key $PK_B$ and the secret key $SK_B$ may be generated by the key generator 241 of the user client 20, for example. Additionally, the generated public key $PK_B$ and secret key $SK_B$ may also be stored in the client memory 220 of the user client 20, for example. Note that the type of public-key authentication scheme corresponding to the public key $PK_B$ and the secret key $SK_B$ is not particularly limited, and a scheme of any type may be used. Furthermore, the public key $PK_B$ and the secret key $SK_B$ are not limited to being generated by the key generator 241, and may be acquired by any method insofar as the user B (user client 20) possesses a public key $PK_B$ and a secret key $SK_B$.

Next, the user B informs the user A of the public key $PK_B$ from between the generated public key $PK_B$ and secret key $SK_B$ (step S703). The way of communicating the public key $PK_B$ from the user B to the user A is not particularly limited, and any communication mechanism may be used, such as writing, email, or speech, for example.

Next, the user A logs into the online storage service (step S705). Herein, a login may refer to a request to use the online storage service, for example. Specifically, in the present embodiment, by logging into the online storage service, the user A is able to use a data area assigned to the user A from among the data areas of the storage unit 120 in the server 10.

Next, the user A requests the server 10 to set the public key PKB communicated in step S703 in a given area (a shared area) that the user A wants to share with another user (that is, the user B) within the area assigned to the user A from among the data areas (step S707). At the server 10 receiving the request, the public key $PK_B$ is set in the shared area (step S709). In step S709, the public key setter 131 of the server 10 sets the public key PKB in the shared area as described in the above section [3-1. Server], for example.

Next, the user B transmits to the server 10 an access request for the shared area set with the public key $PK_B$ by the user A (step S711). The access request may be transmitted to the server 10 via the client communication unit 210 of the user client 20 as described in the above section [3-2. User client], for example.

Next, an access authentication process using a public-key authentication scheme is conducted for the shared area between the server 10 that received the access request, and the user client 20 that transmitted the access request (step S713). The access authentication process may be conducted between the device authentication processor 132 and the client authentication processor 242 as described in the above section [3-1. Server] and the above section [3-2. User client], for example.

If the result of the access authentication process in step S713 is positive, the server 10 grants access to the shared area from the user client 20 (step S715). The user B (user client 20) is then able to access the data area whose access has been granted (step S717). In other words, the user B (user client 20) is able to conduct various processes, such as writing, reading, and editing, on various data being stored in the shared area from the server 10 (step S719).

Thus, as described above with reference to FIG. 7, in an access authentication method according to an embodiment of the present disclosure, a public key corresponding to a public-key authentication scheme is set in an access area defined as a given area of an object of access, and access to the access area is authenticated against a secret key paired with that public key. Consequently, it becomes possible to further raise safety in a sharing system.

Note that the above description takes a data sharing system provided by an online storage service as an example of a sharing system, and describes a case in which the object of access is a data area of the storage, while the access area is a given area within that data area. However, an access authentication process according to the present embodiment is not limited to such an example, and is applicable to other systems insofar as the system is a sharing system.

5. Exemplary Modifications

Next, a modification of the embodiment described heretofore will be described. The above description takes a data sharing system provided by an online storage service as an example of a sharing system, and describes a case in which the object of access is a data area of the storage, while the access area is a given area within that data area. However, the present embodiment is not limited to such an example. For example, the object of access may also be a physically lockable case, and the unlocking of the case may be authenticated by an access authentication process. More specifically, the object of access may be a set of multiple lockable lockers, and the access area may be one or more of those lockers.

In other words, in the present embodiment, a device authentication processor of an information processing device (server) may authenticate the unlocking of a case by authenticating access to an access area. Namely, in the case where the object of access is a set of multiple lockable lockers, and the access area is one or more of those lockers, the term "access" may indicate a process that unlocks the lockers.

Hereinafter, an access authentication process will be described specifically and with reference to FIGS. 8A to 8E as a modification of an embodiment of the present disclosure. The access authentication process herein is for the case in which the object of access is a set of multiple lockable lockers, and the access area is one or more of those lockers. FIGS. 8A to 8E are diagrams for explaining a modification of the present embodiment. Note that in this modification, part of the functions and configuration of the server 10, such as the storage unit 120 in the server 10 illustrated in FIG. 4, for example, are replaced by a set of lockable lockers. Also, there additionally exist driving units that lock and unlock each of the lockers. These driving units lock and unlock each locker under control by the device controller 130. Herein, the differences versus the server 10 illustrated in FIG. 4 will be described primarily, and detailed description will be reduced or omitted for parts of the configuration that are unchanged.

Figure 8A:
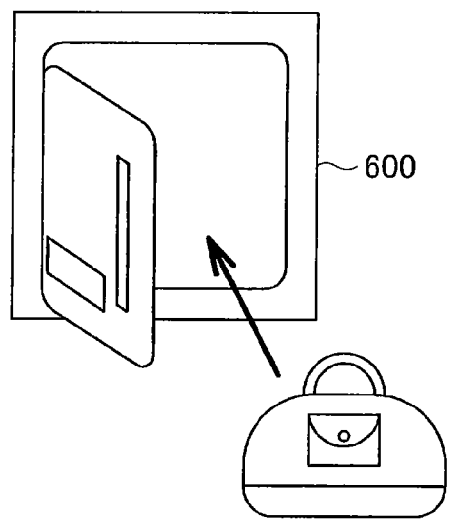
FIG. 8A is a diagram for explaining a modification of an embodiment.

As discussed above, in the present modification, a given locker within a set of lockable lockers is treated as the access area. FIGS. 8A to 8E will be used to describe a processing sequence of an access authentication process according to the present embodiment, taking as an example the case in which one particular locker is the access area. First, as illustrated in FIG. 8A, a personal item is placed inside a locker 600 by a particular user, for example.

Figure 8B:
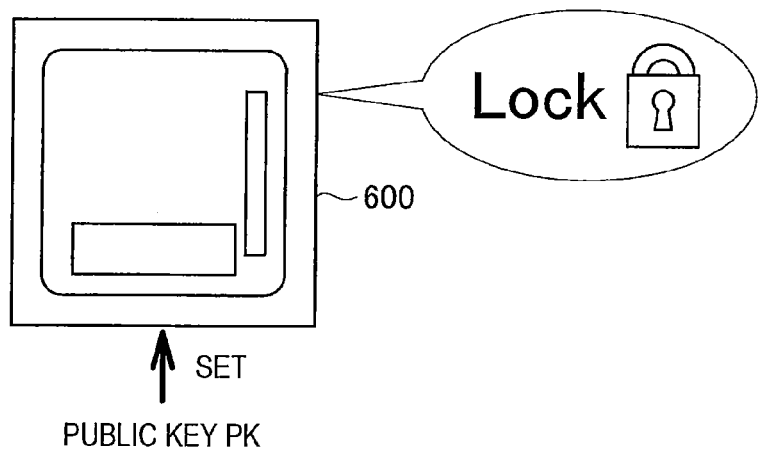
FIG. 8B is a diagram for explaining a modification of an embodiment.

Next, when locking the locker 600, a public key PK is set in the locker 600 by the public key setter 131 illustrated in FIG. 4, for example, as illustrated in FIG. 8B. Herein, a public key PK expressed by the string "1A2u9yD65B", for example, is set in the locker 600 as an example of the public key PK.

Figure 8C:
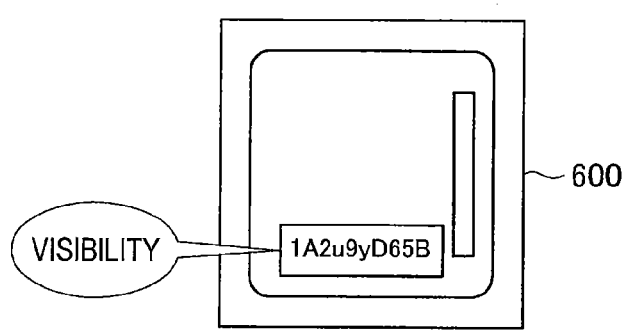
FIG. 8C is a diagram for explaining a modification of an embodiment.

The fact that a public key PK has been set in the locker 600 may be explicitly indicated by displaying the string "1A2u9yD65B" expressing the public key PK in a display window provided in a partial area of the door of the locker 600, as illustrated in FIG. 8C, for example. By displaying a string expressing a public key PK in a display window provided on the locker 600, it is possible to inform other users whether or not a public key has been set in the locker 600. In addition, it is possible to inform the user possessing that public key PK whether or not his or her own public key has been set in the locker 600. In other words, by displaying a string expressing a public key PK in a display window provided on the locker 600, it is possible to ensure visibility for users.

Figure 8D:
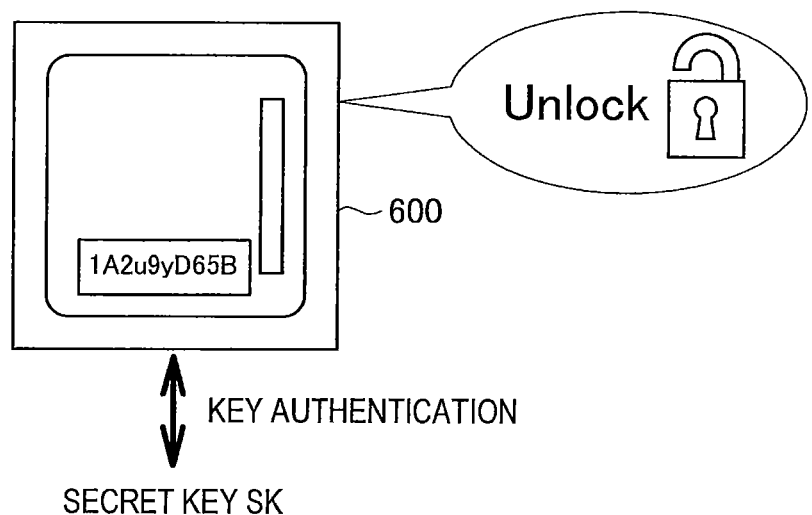
FIG. 8D is a diagram for explaining a modification of an embodiment.
Figure 8E:
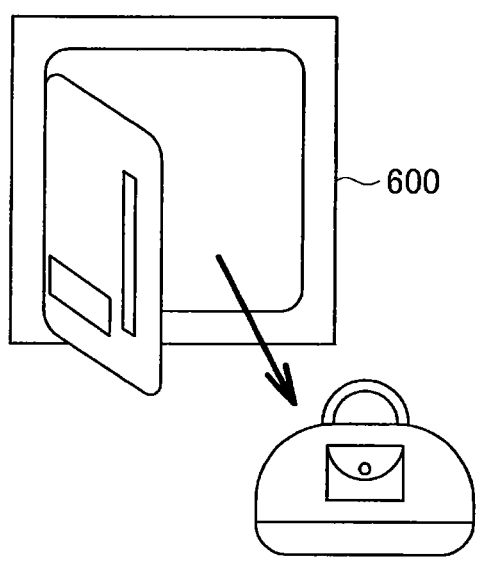
FIG. 8E is a diagram for explaining a modification of an embodiment.

An access authentication process using a public-key authentication scheme is conducted in order to retrieve a personal item from the locker 600, or in other words, in order to unlock the locker 600. For example, an authentication process using a public-key authentication scheme is conducted by the device authentication processor 132 illustrated in FIG. 4, for example, between the public key PK set in the locker 600, and an secret key SK paired with that public key PK, as illustrated in FIG. 8D. If the result of the authentication process is positive, the device authentication processor 132 reports the result to a driving unit that includes the functions of locking and unlocking the locker, for example. The locker 600 is then unlocked by the driving unit that receives the report of a positive result, and the personal item inside is retrieved, as illustrated in FIG. 8E.

As described above with reference to FIGS. 8A to 8E, in the present modification, a locker is unlocked by an access authentication process using a public-key authentication scheme, thus making it possible to store personal items more safely. Also, since a physical (tangible) key is not used in the present modification, it is possible to avoid troubles that may occur with existing lockers that use a physical key, such as key loss.

Also, in the present modification, the user that inserts a personal item and the user that retrieves the personal item may be the same user, or different users. In the case where the user that inserts a personal item and the user that retrieves the personal item are the same user, it is sufficient for that user to possess a key pair of a public key PK and a secret key SK. Meanwhile, in the case where the user that inserts a personal item (user A, for example) and the user that retrieves the personal item (user B, for example) are different users, the user B informs the user A in advance of a public key $PK_B$ from a key pair of the public key $PK_B$ and a secret key $SK_B$ possessed by the user B, for example. When locking the locker, the user A sets the communicated public key $PK_B$ in that locker. The user B is able to unlock a locker set with his or her own public key $PK_B$ by using the secret key $SK_B$ in his or her possession. Consequently, it is possible to safely deliver an item without having the user A and the user B meet directly and hand over a key.

Note that in the case where a locker according to the present modification is what is called a coin locker, for example, a payment process may also be conducted as appropriate, such as when setting a public key PK and locking a locker, or when using a secret key SK and unlocking a locker.

6. Hardware Configuration

Next, a hardware configuration of an information processing device (server) and an information processing client (user client) according to an embodiment of the present disclosure will be described in detail with reference to FIG. 9. FIG. 9 is a block diagram for explaining a hardware configuration of an information processing device and an information processing client according to an embodiment of the present disclosure.

The server 10 and the user client 20 are primarily equipped with a CPU 901, ROM 903, and RAM 905. Also, the server 10 and the user client 20 are additionally equipped with a host bus 907, a bridge 909, an external bus 911, an interface 913, an input device 915, an output device 917, a storage device 919, a communication device 921, a drive 923, and a connection port 925.

The CPU 901 functions as a computational processing device and a control device, and controls all or part of the operation in the server 10 and the user client 20 by following various programs recorded in the ROM 903, the RAM 905, the storage device 919, or a removable recording medium 929. The CPU 931 corresponds to the device controller 130 and the client controller 240 in the present embodiment, for example. The ROM 903 stores information such as programs and computational parameters used by the CPU 901. The RAM 905 temporarily stores information such as programs used by the CPU 901, and parameters that change as appropriate during the execution of a program. These memory units are connected to each other by a host bus 907 realized by an internal bus, such as a CPU bus.

The host bus 907 is connected to the external bus 911 such as a Peripheral Component Interconnect/Interface (PCI) bus via the bridge 909.

The input device 915 is an operating mechanism operated by a user, such as a mouse, a keyboard, a touch panel, or one or more buttons, switches, and levers, for example. In addition, the input device 915 may also be remote control mechanism utilizing infrared or some other electromagnetic wave (also referred to as a remote), and may also be an externally connected device 931 such as a mobile phone or PDA associated with the operation of the server 10 and the user client 20, for example. Furthermore, the input device 915 is made up of an input control circuit or the like, which generates an input signal on the basis of information input by a user using the above operating mechanism, and outputs the generated input signal to the CPU 901, for example. By operating the input device 915, a user of the server 10 and the user client 20 is able to input various data and instruct the server 10 and the user client 20 to perform processing operations, for example.

The output device 917 is realized by a device capable of visually or aurally reporting acquired information to a user. Such a device may be a display device such as a CRT display device, a liquid crystal display device, a plasma display device, an EL display device, or indicator lights, an audio output device such as one or more speakers and headphones, a printer, or the like. The output device 917 outputs results obtained by various processes conducted by the server 10 and the user client 20, for example. Specifically, a display device displays results obtained by various processes conducted by the server 10 and the user client 20 as text or images. This display device corresponds to the client display unit 230 in the present embodiment, for example. On the other hand, an audio output device outputs an analog signal converted from an audio signal made up of played-back audio data, acoustic data, or the like.

The storage device 919 is a device used for data storage, realized as an example of the memory in the server 10 and the user client 20. In the present embodiment, the storage device 919 corresponds to the storage unit 120 and the client memory 220, for example. Also, in the case where the server 10 is equipped with device memory, other than the storage unit 120, that stores various information used in various processes by the device controller 130 as well as the result of various processes by the device controller 130, such device memory may also be configured to correspond to the storage device 919. The storage device 919 may be a magnetic storage device such as a hard disk drive (HDD), a semiconductor storage device, an optical storage device, or a magneto-optical storage device, for example. The storage device 919 stores programs executed by the CPU 901, various data, and various externally acquired data. As another example, the storage device 919 may also store information related to a key pair of a public key PK and a secret key SK corresponding to a public-key authentication scheme. Furthermore, a data area provided to a user in an online storage service may also be provided in the storage device 919, for example.

The communication device 921 is a communication interface realized by a communication device that connects to a communication network 927, for example. For example, in the present embodiment, the communication device 921 corresponds to the device communication unit 110 and the client communication unit 210. Also, in the present embodiment, the communication network 927 may correspond to the network 300 illustrated in FIGS. 3A to 3D, for example. In other words, in the present embodiment, the server 10 and the user client 20 may be communicably connected to each other via the communication device 921 and the communication network 927. The communication device 921 is a device such as a wired or wireless local area network (LAN), Bluetooth (registered trademark), or Wireless USB (WUSB) communication card, for example. The communication device 921 may also be an optical communication router, an asymmetric digital subscriber line (ADSL) router, or a modem for any of various types of communication. Such a communication device 921 is able to transmit and receive signals or other information to and from the Internet or another communication device in accordance with a given protocol such as TCP/IP, for example. Also, the communication network 927 connected to the communication device 921 may be realized by a network or the like connected in a wired or wireless manner, and may be the Internet, a home LAN, infrared communication, radio-wave communication, or satellite communication, for example.

Also, although not mentioned in the description given in the above section <3. Device function and configuration>, a server 10 and a user client 20 according to the present embodiment may be additionally equipped with the drive 923 and the connection port 925 illustrated in FIG. 9.

The drive 923 is a reader/writer for a recording medium, and is internally housed inside, or externally attached to, the server 10 and the user client 20. The drive 923 reads out information recorded onto a removable recording medium 929 such as an inserted magnetic disk, optical disc, magneto-optical disc, or semiconductor memory, and outputs such information to the RAM 905, for example. In addition, the drive 923 is also capable of writing and recording information onto a removable recording medium 929 such as an inserted magnetic disk, optical disc, magneto-optical disc, or semiconductor memory. The removable recording medium 929 is an instance of DVD media, HD-DVD media, or Blu-ray media, for example. The removable recording medium 929 may also be a medium such as a CompactFlash (CF; registered trademark), flash memory, or Secure Digital (SD) memory card. Also, the removable recording medium 929 may be an integrated circuit (IC) card mounted with a contactless IC chip, or some other electronic equipment, for example.

The connection port 925 is a port for directly connecting an externally connected device 931 to the server 10 and the user client 20. Examples of the connection port 925 include a Universal Serial Bus (USB) port, an IEEE 1394 port, and a Small Computer System Interface (SCSI) port. Other examples of the connection port 925 include an RS-232C port, an optical audio socket, or a High-Definition Multimedia Interface (HDMI) port. By connecting an externally connected device 931 to the connection port 925, the server 10 and the user client 20 are able to acquire various data from the externally connected device 931, and provide various data to the externally connected device 931. For example, the server 10 and the user client 20 may acquire from the externally connected device 931 various information related to a public-key authentication scheme used in an access authentication process according to the present embodiment.

The above thus illustrates an example of a hardware configuration able to realize the functions of a server 10 and a user client 20 according to an embodiment of the present disclosure. Each of the above structural elements may be realized using general-purpose members, but may also be realized in hardware specialized in the function of each structural element. Consequently, it is possible to appropriately modify the hardware configuration to be used according to the technological level at the time of carrying out the present embodiment.

Note that it is also possible to develop a computer program for realizing the respective functions of a server 10 and a user client 20 according to the present embodiment as discussed above, and implement the server 10 and the user client 20 with a personal computer or the like. In addition, a computer-readable recording medium storing such a computer program may also be provided. The recording medium may be a magnetic disc, an optical disc, a magneto-optical disc, or flash memory, for example. Furthermore, the above computer program may also be delivered via a network, for example, without using a recording medium.

7. MQ Authentication Scheme

The foregoing thus describes an embodiment of the present disclosure in detail. Herein, in an access authentication process according to an embodiment of the present disclosure, authentication using a public-key authentication scheme is conducted to provide access to a given area of an object of access in a sharing system, as discussed earlier. However, the type of public-key authentication scheme is not particularly limited, and it is possible to apply a given public-key authentication scheme. In the present embodiment, superior advantages may be obtained by using a public-key authentication scheme that bases its safety on the difficulty of solving high-order, multivariate systems of equations as the public-key authentication scheme herein.

Accordingly, in this section, a public-key authentication scheme that bases its safety on the difficulty of solving high-order, multivariate systems of equations will be described, and in addition, the advantageous effects produced by using such a public-key authentication scheme will be described in detail. Herein, the following sections [7-1. Example of specific algorithm structures] and [7-2. Example of parallelized algorithm structures] describe a case in which the high-order, multivariate systems of equations are second-order, multivariate systems of equations as a specific example of such a public-key authentication scheme. Note that a public-key authentication scheme that bases its safety on the difficulty of solving second-order, multivariate systems of equations is sometimes called a multivariate quadratic (MQ) authentication scheme.

Additionally, the following sections [7-1. Example of specific algorithm structures] and [7-2. Example of parallelized algorithm structures] also describe a case in which n is 3 in the n-pass public-key authentication scheme described in the section <1. Overview of public-key authentication schemes> (that is, a 3-pass public-key authentication scheme) as a specific example of such a public-key authentication scheme. Note that a 3-pass public-key authentication scheme may also be referred to as a "3-pass scheme" in some cases.

[7-1. Example of Specific Algorithm Structures]

Figure 10:
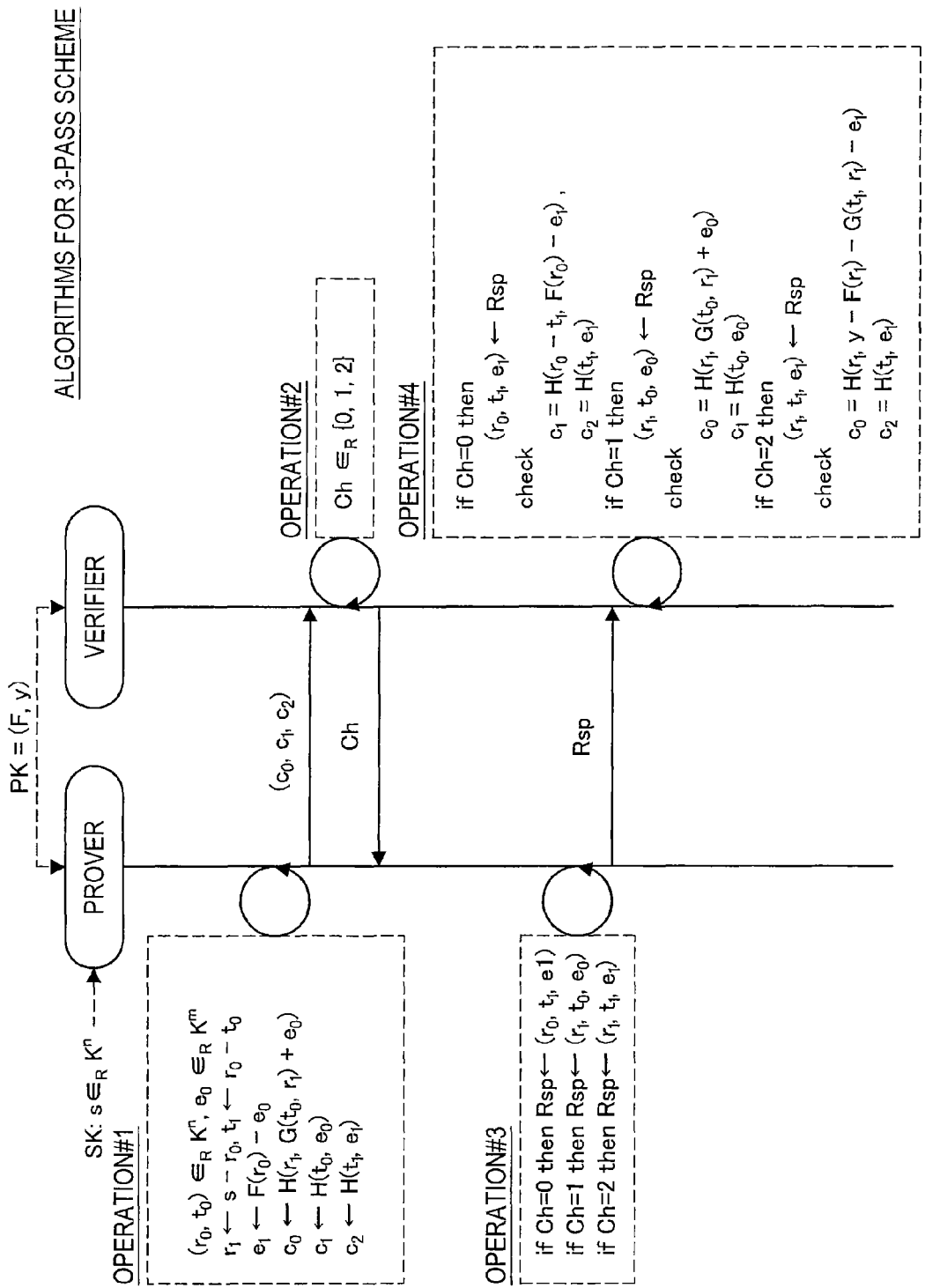
FIG. 10 is a diagram illustrating specific algorithm structures related to a 3-pass scheme.

First, an example of specific algorithm structures related to a 3-pass scheme will be introduced with reference to FIG. 10. FIG. 10 is a diagram illustrating specific algorithm structures related to a 3-pass scheme. At this point, consider the case of using a system of second-order polynomials $(f_1(x), \ldots, f_m(x))$ as part of a public key PK. However, assume that a second-order polynomial $f_i(x)$ is expressed as in the following Eq. 6. In addition, x will denote the vectors $(x_1, \ldots, x_n)$, and the multivariate polynomial F(x) will denote the system of second-order polynomials $(f_1(x), \ldots, f_m(x))$.

$$f_i(x_1, \ldots, x_n) = \sum_{j,k} a_{ijk} x_j x_k + \sum_j b_{ij} x_j \tag{3}$$

The system of second-order polynomials $(f_1(x), \ldots, f_m(x))$ may also be expressed as in the following Eq. 4, where $A_1$ to $A_m$ are n×n matrices, and $b_1$ to $b_m$ are respective n×1 vectors.

$$F(x) = \begin{pmatrix} f_1(x) \\ \vdots \\ f_m(x) \end{pmatrix} = \begin{pmatrix} x^T A_1 x + b_1^T x \\ \vdots \\ x^T A_m x + b_m^T x \end{pmatrix} \tag{4}$$

Using this expression, the multivariate polynomial F may be expressed as in the following Eq. 5 and 6. These expressions may be easily confirmed from Eq. 7 below.

$$F(x+y) = F(x) + F(y) + G(x, y) \tag{5}$$

$$G(x, y) = \begin{pmatrix} y^T(A_1^T + A_1)x \\ \vdots \\ y^T(A_m^T + A_m)x \end{pmatrix} \tag{6}$$

$$\begin{aligned} f_i(x, y) &= (x+y)^T A_i (x+y) + b_i^T (x+y) \\ &= x^T A_i x + x^T A_i y + y^T A_i x + y^T A_i y + b_i^T x + b_i^T y \\ &= f_i(x) + f_i(y) + x^T A_i y + y^T A_i x \\ &= f_i(x) + f_i(y) + x^T (A_i^T)^T y + y^T A_i x \\ &= f_i(x) + f_i(y) + (A_i^T x)^T y + y^T A_i x \\ &= f_i(x) + f_i(y) + y^T (A_i^T x) + y^T A_i x \\ &= f_i(x) + f_i(y) + y^T (A_i^T + A_i) x \end{aligned} \tag{7}$$

When dividing F(x+y) into a first portion dependent on x, a second portion dependent on y, and a third portion dependent on both x and y in this way, the term G(x, y) corresponding to the third portion becomes bilinear with respect to x and y. Hereinafter, the term G(x, y) may be referred to as the bilinear term in some cases. Using this property enables the construction of an efficient algorithm.

For example, use the vector $t_0$ that is an element of the set $K^n$ and the vector $e_0$ that is an element of the set $K^m$ to express the multivariate polynomial $F^1(x)$, which is used to mask the multivariate polynomial F(x+r), as $F_1(x)=G(x, t_0)+e_0$. In this case, the sum of the multivariate polynomial $F(x+r_0)$ and G(x) is expressed as in Eq. 8 below. Provided that $t_1=r_0+t_0$ and $e_1=F(r_0)+e_0$, the multivariate polynomial $F_2(x)=F(x+r_0)+F_1(x)$ can be expressed by the vector $t_1$ that is an element of the set $K^n$ and the vector $e_1$ that is an element of the set $K^m$. For this reason, setting $F_1(x)=G(x, t_0)+e_0$ enables the expression of $F_1$ and $F_2$ using a vector in $K^n$ and a vector in $K^m$, making it possible to realize an efficient algorithm with a small data size for communication.

$$\begin{aligned} F(x+r_0) + F_1(x) &= F(x) + F(r_0) + G(x, r_0) + G(x, t_0) + e_0 = \\ & F(x) + G(x, r_0 + t_0) + F(r_0) + e_0 \end{aligned} \tag{8}$$

Note that no information regarding $r_0$ is divulged from $F_2$ (or $F_1$). For example, even if $e_1$ and $t_1$ (or $e_0$ and $t_0$) are given, no information about $r_0$ is ascertained as long as $e_0$ and $t_0$ (or $e_1$ and $t_1$) are unknown. Consequently, zero-knowledge is ensured. Hereinafter, algorithms for a 3-pass scheme constructed on the basis of the above logic will be described. The algorithms for the 3-pass scheme described herein are made up of a key-generating algorithm Gen, a prover algorithm P, and a verifier algorithm V like the following.

(Key-Generating Algorithm Gen)

The key-generating algorithm Gen generates m multivariate polynomials $f_1(x_1, \ldots, x_n), \ldots, f_m(x_1, \ldots, x_n)$ defined on a ring K, and a vector $s=(s_1, \ldots, s_n)$ that is an element of the set $K^n$. Next, the key-generating algorithm Gen calculates $y=(y_1, \ldots, y_m) \leftarrow (f_1(s), \ldots, f_m(s))$. The key-generating algorithm Gen also sets $f_1(x_1, \ldots, x_n), \ldots, (x_1, \ldots, x_n)$ as the public key PK, and set s as the secret key.

(Prover Algorithm P, Verifier Algorithm V)

Hereinafter, a process executed by the prover algorithm P and a process executed by the verifier algorithm V during the session protocol will be described with reference to FIG. 10. During the session protocol, the prover indicates to the verifier that "I know an s satisfying y=F(s)", without divulging information about the secret key s to the verifier. Meanwhile, the verifier verifies whether or not the prover knows an s satisfying y=F(s). Note that the public key PK is assumed to be made public to the verifier. Also, the secret key s is assumed to be kept a secret by the prover. Hereinafter, the description will proceed following the flowchart illustrated in FIG. 10.

Operation #1:

As illustrated in FIG. 10, the prover algorithm P first randomly generates the vector $r_0$, $t_0$ that is an element of the set $K^n$, and the vector $e_0$ that is an element of the set $K^m$. Subsequently, the prover algorithm P calculates $r_1 \leftarrow s - r_0$. This calculation is equivalent to masking the secret key s with the vector $r_0$. Additionally, the prover algorithm P calculates $t_1 \leftarrow r_0 - t_0$. Subsequently, the prover algorithm P calculates $e_1 \leftarrow F(r_0) - e_0$.

Operation #1 (Continued):

Subsequently, the prover algorithm P calculates $c_0 \leftarrow H(r_1, G(t_0, r_1) + e_0)$. Subsequently, the prover algorithm P calculates $c_1 \leftarrow H(t_0, e_0)$. Subsequently, the prover algorithm P calculates $c_2 \leftarrow H(t_1, e_1)$. The message $(c_0, c_1, c_2)$ generated in operation #1 is sent to the verifier algorithm V.

Operation #2:

Upon receiving the message $(c_0, c_1, c_2)$, the verifier algorithm V selects which verification pattern to use from among three verification patterns. For example, the verifier algorithm V may select a numerical value from among three numerical values {0, 1, 2} representing verification patterns, and set the selected numerical value in a challenge Ch. This challenge Ch is sent to the prover algorithm P.

Operation #3:

Upon receiving the challenge Ch, the prover algorithm P generates a response Rsp to send to the verifier algorithm V in response to the received challenge Ch. In the case where Ch=0, the prover algorithm P generates a response Rsp=$(r_0, t_1, e_1)$. In the case where Ch=1, the prover algorithm P generates a response Rsp=$(r_1, t_0, e_0)$. In the case where Ch=2, the prover algorithm P generates a response Rsp=$(r_1, t_1, e_1)$. The response Rsp generated in operation #3 is sent to the verifier algorithm V.

Operation #4:

Upon receiving the response Rsp, the verifier algorithm V executes the following verification process using the received response Rsp.

In the case where Ch=0, the verifier algorithm V verifies whether or not the equality of $c_1 = H(r_0 - t_1, F(r_0) - e_1)$ holds. In addition, the verifier algorithm V verifies whether or not the equality of $c_2 = H(t_1, e_1)$ holds. The verifier algorithm V outputs the value 1 to indicate authentication success in the case where these verifications all succeed, and outputs the value 0 to indicate authentication failure in the case where a verification fails.

In the case where Ch=1, the verifier algorithm V verifies whether or not the equality of $c_0 = H(r_1, G(t_0, r_1) + e_0)$ holds. In addition, the verifier algorithm V verifies whether or not the equality of $c_1 = H(t_0, e_0)$ holds. The verifier algorithm V outputs the value 1 to indicate authentication success in the case where these verifications all succeed, and outputs the value 0 to indicate authentication failure in the case where a verification fails.

In the case where Ch=2, the verifier algorithm V verifies whether or not the equality of $c_0 = H(r_1, y - F(r_1) - G(t_1, r_1) - e_1)$ holds. In addition, the verifier algorithm V verifies whether or not the equality of $c_2 = H(t_1, e_1)$ holds. The verifier algorithm V outputs the value 1 to indicate authentication success in the case where these verifications all succeed, and outputs the value 0 to indicate authentication failure in the case where a verification fails.

The foregoing thus describes an example of efficient algorithm structures related to a 3-pass scheme.

[7-2. Example of Parallelized Algorithm Structures]

Figure 11:
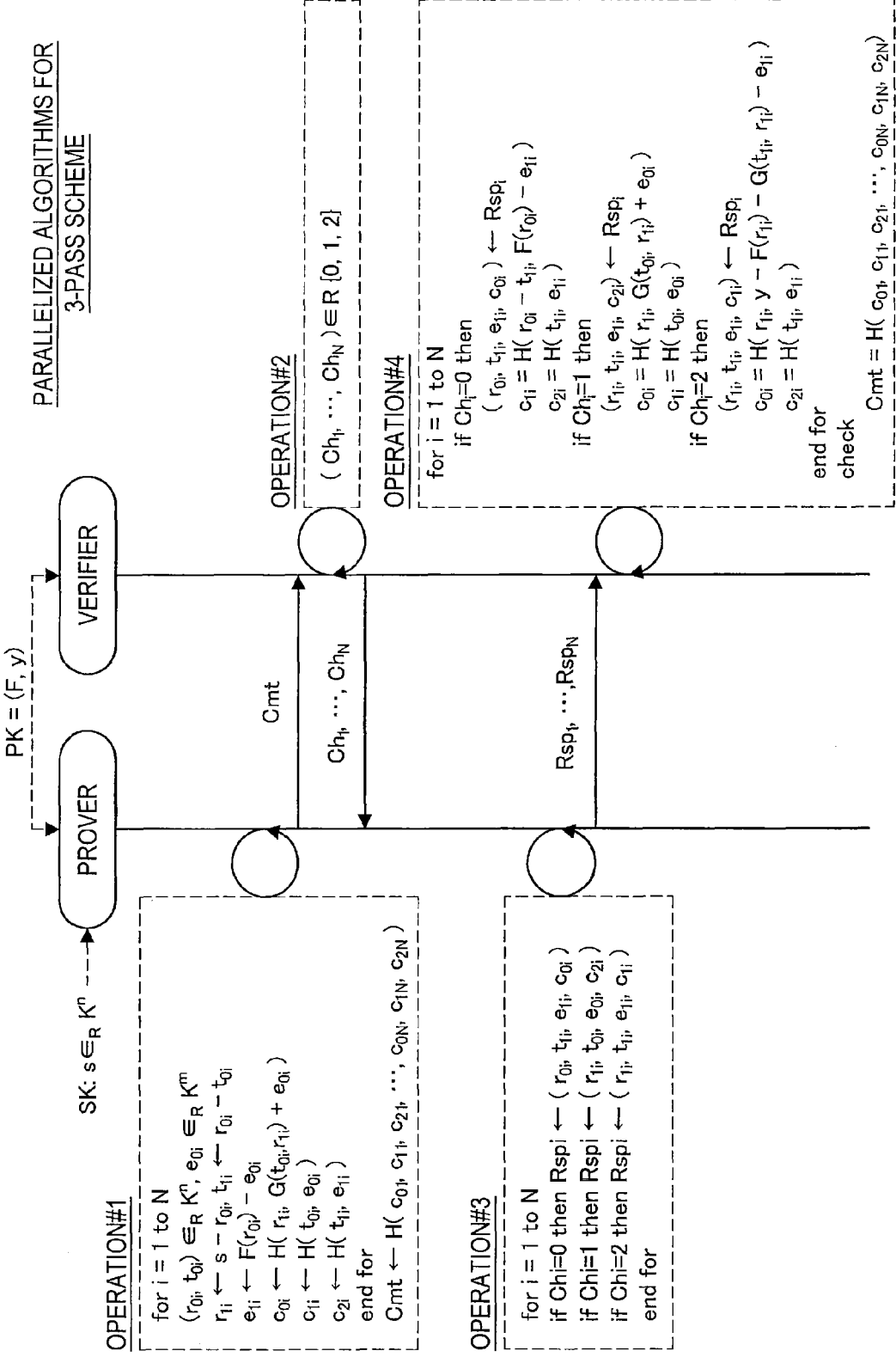
FIG. 11 is a diagram illustrating the parallelization of specific algorithms related to a 3-pass scheme.

Next, a method of parallelizing the algorithms of the 3-pass scheme illustrated in FIG. 10 will be described with reference to FIG. 11. FIG. 11 is a diagram illustrating the parallelization of specific algorithms related to a 3-pass scheme. Note that the since the structure of the key-generating algorithm Gen is similar to the key-generating algorithm Gen described in the above section [7-1. Example of specific algorithm structures], detailed description thereof will be reduced or omitted herein.

Applying the above session protocol makes it possible to keep the probability of a successful forgery to ⅔ or less. Consequently, executing the session protocol twice makes it possible to keep the probability of a successful forgery to $(⅔)^2$ or less. Furthermore, if the session protocol is executed N times, the probability of a successful forgery becomes $(⅔)^N$, and if N is set to a sufficiently large number (N=140, for example), the probability of a successful forgery becomes negligibly small.

Conceivable methods of executing a session protocol multiple times include a serial method that sequentially repeats the exchange of message, challenge, and response multiple times, and a parallel method that exchanges multiple messages, challenges, and responses in a single exchange, for example. In addition, hybrid methods combining a serial method and a parallel method are also conceivable. Algorithms that execute the above session protocol related to a 3-pass scheme in parallel (hereinafter designated parallelized algorithms) will now be described with reference to FIG. 11.

Operation #1:

As illustrated in FIG. 11, the prover algorithm P first executes the following processes (1) to (6) for i=1 to N.

Process (1): The prover algorithm P randomly generates the vectors $r_{0i}$, $t_{0i}$ that are elements of the set and the vector $e_{0i}$ that is an element of the set $K^m$.

Process (2): The prover algorithm P calculates $r_{1i} \leftarrow s - r_{0i}$. This calculation is equivalent to masking the secret key s with the vector $r_{0i}$. Additionally, the prover algorithm P calculates $t_{1i} \leftarrow r_{0i} + t_{0i}$.

Process (3): The prover algorithm P calculates $e_{1i} \leftarrow F(r_{0i}) - e_{0i}$.

Process (4): The prover algorithm P calculates $c_{0i} \leftarrow H(r_{1i}, G(r_{1i}, t_{0i}) + e_{0i})$.

Process (5): The prover algorithm P calculates $c_{1i} \leftarrow H(t_{0i}, e_{0i})$.

Process (6): The prover algorithm P calculates $c_{2i} \leftarrow H(t_{1i}, e_{1i})$.

Operation #1 (Continued):

After executing the above processes (1) to (6) for i=1 to N, the prover algorithm P calculates $Cmt \leftarrow H(c_{01}, e_{11}, c_{21}, \ldots, c_{0N}, c_{1N}, c_{2N})$. The hash value Cmt generated in operation #1 is sent to the verifier algorithm V. In this way, the message $(c_{01}, e_{11}, c_{21}, \ldots, c_{0N}, c_{1N}, c_{2N})$ is converted into a hash value before being sent to the verifier algorithm V, thus enabling a reduction in the communication volume.

Operation #2:

Upon receiving the hash value Cmt, the verifier algorithm V selects which verification pattern to use from among three verification patterns, for each of i=1 to N. For example, the verifier algorithm V may, for each of i=1 to N, select a numerical value from among three numerical values {0, 1, 2} representing verification patterns, and set the selected numerical value in a challenge $Ch_i$. The challenges $Ch_1, \ldots, Ch_N$ are sent to the prover algorithm P.

Operation #3:

Upon receiving the challenges $Ch_1, \ldots, Ch_N$, the prover algorithm P generates responses $Rsp_1, \ldots, Rsp_N$ to send to the verifier algorithm V in response to each of the received challenges $Ch_1, \ldots, Ch_N$. In the case where $Ch_i=0$, the prover algorithm P generates a response $Rsp_i = (r_{0i}, t_{1i}, e_{1i}, c_{0i})$. In the case where $Ch_i=1$, the prover algorithm P generates a response $Rsp_i = (r_{1i}, t_{0i}, e_{0i}, c_{2i})$. In the case where $Ch_i=2$, the prover algorithm P generates a response $Rsp_i = (r_{1i}, t_{1i}, e_{1i}, c_{1i})$.

The responses $Rsp_1, \ldots, Rsp_N$ generated in operation #3 are sent to the verifier algorithm V.

Operation #4:

Upon receiving the responses $Rsp_1, \ldots Rsp_N$, the verifier algorithm V executes the following processes (1) to (3) for i=1 to N, using the received responses $Rsp_1, \ldots, Rsp_N$. Herein, the verifier algorithm V executes the process (1) for the case where $Ch_i=0$, the process (2) in the case where $Ch_i=1$, and the process (3) in the case where $Ch_i=2$.

Process (1): In the case where $Ch_i=0$, the verifier algorithm V retrieves $(r_{0i}, t_{1i}, e_{1i}, c_{0i})$ from $Rsp_i$. Subsequently, the verifier algorithm V calculates $c_{1i} = H(r_{0i} - t_{1i}, F(r_{0i}) - e_{1i})$. In addition, the verifier algorithm V calculates $c_{2i} = H(t_{1i}, e_{1i})$. The verifier algorithm V then stores $(c_{0i}, c_{1i}, c_{2i})$.

Process (2): In the case where $Ch_i=1$, the verifier algorithm V retrieves $(r_{1i}, t_{0i}, e_{0i}, c_{2i})$ from $Rsp_i$. Subsequently, the verifier algorithm V calculates $c_{0i} = H(r_{1i}, G(t_{0i}, r_{1i}) + e_{0i})$. In addition, the verifier algorithm V calculates $c_{1i} = H(t_{0i}, e_{0i})$. The verifier algorithm V then stores $(c_{0i}, c_{1i}, c_{2i})$.

Process (3): In the case where $Ch_i=2$, the verifier algorithm V retrieves $(r_{1i}, t_{1i}, e_{1i}, c_{1i})$ from $Rsp_i$. Subsequently, the verifier algorithm V calculates $c_{0i} = H(r_{1i}, y - F(r_{1i}) - G(t_{1i}, r_{1i}) - e_{1i})$. In addition, the verifier algorithm V calculates $c_{2i} = H(t_{1i}, e_{1i})$. The verifier algorithm V then stores $(c_{0i}, c_{1i}, c_{2i})$.

After executing the above processes (1) to (3) for i=1 to N, the verifier algorithm V verifies whether or not the equality of $Cmt = H(c_{01}, c_{11}, c_{21}, \ldots, c_{0N}, c_{1N}, c_{2N})$ holds. The verifier algorithm V outputs the value 1 to indicate authentication success in the case where the verification succeeds, and outputs the value 0 to indicate authentication failure in the case where the verification fails.

The foregoing thus describes an example of efficient parallelized algorithm structures related to a 3-pass scheme.

Note that literature such as Japanese Unexamined Patent Application Publication No. 2012-98690, for example, may be referenced for a more detailed description of the public-key authentication scheme that bases its safety on the difficult of solving high-order, multivariate systems of equations described above.

As described above with reference to FIGS. 10 and 11, a multivariate polynomial is used as a public key in an MQ authentication scheme. By using a multivariate polynomial as a public key, it becomes possible to reduce the size of the public key while maintaining the difficulty of mathematical solvability compared to the RSA scheme and ECC scheme widely used at present, for example. For example, whereas the typical public key sizes in the RSA scheme and the ECC scheme are 1024-bit and 160-bit, respectively, a public key in the MQ authentication scheme may be created with a minimum size of 80 bits.

For example, in the case where the public key size is 80-bit, a string expressing the public key may be made up of approximately 15 Japanese hiragana characters. Consequently, in the case where a particular user sees that a string expressing a public key is being displayed, for example, it becomes easier for the user to intuitively determine whether or not the string is the user's own. Meanwhile, with the RSA scheme and the ECC scheme of the related art, as the public key increases in size, the number of characters in a string expressing the public key increases (and the length of the string becomes longer). Consequently, it becomes more difficult for a user to intuitively determine whether or not a displayed string is the user's own. In other words, using the MQ authentication scheme as the public-key authentication scheme enables reduced public key size and higher user visibility of a string expressing a public key.

Consequently, in the case where the access area is a folder provided in a given area within a data area of storage, and a public key is set in that folder, as described in the above section [3-1. Information processing device (server)], for example, further advantageous effects may be obtained by using the MQ authentication scheme as the public-key authentication scheme. For example, when setting a public key in a folder, it is possible to include a string corresponding to the public key in the folder name, as described in the above section [3-1. Information processing device (server)]. By using the MQ authentication scheme as the public-key authentication scheme, the length of the string corresponding to the public key may be shortened so that the folder name does not become unwieldy. In additionally, shortening the length of the string corresponding to the public key raises the user visibility of the folder name, and enables a user to more easily discover a folder set with the public key paired with the user's own secret key from among the folders being displayed on-screen, for example. Consequently, using an MQ authentication scheme as the public-key authentication scheme enables improved user utility in a sharing system.

8. Conclusion

As described above, according to an embodiment of the present disclosure, the following advantageous effects may be obtained.

In the present embodiment, in an access authentication process for a sharing system, a public key corresponding to a public-key authentication scheme is set in an access area defined as a given area of an object of access, and access to the access area is authenticated against a secret key paired with that public key. Consequently, it becomes possible to further raise safety in a sharing system.

Specifically, an access authentication process according to the present embodiment may be suitably applied to a data sharing system using an online storage service, for example. For example, in the case where the sharing system is a data sharing system using an online storage service, the object of access may be a data area assigned to a particular user from among data areas in the storage, and the access area may be a further given data area (shared area) in the data area assigned to the particular user. By setting a public key corresponding to a public-key authentication scheme in the shared area, and authenticating access to the shared area against a secret key paired with the public key, the security level of access to the shared area may be further improved. In addition, it becomes possible to more reliably restrict the users who are able to access the shared area.

Moreover, the sharing system according to an application of the present embodiment is not limited to a data sharing system using an online storage service. For example, the object of access may also be a physically lockable case, and the unlocking of the case may be authenticated by an access authentication process. Specifically, the object of access may be a set of multiple lockable lockers, and the access area may be one or more of those lockers. Unlocking a locker with an access authentication process using a public-key authentication scheme makes it possible to store personal items more safely. Also, since a physical (tangible) key is not used, it is possible to avoid troubles that may occur with existing lockers that use a physical key, such as key loss.

Furthermore, the type of public-key authentication scheme used in the present embodiment is not particularly limited. However, in the present embodiment, superior advantages may be obtained by using a public-key authentication scheme that bases its safety on the difficulty of solving high-order, multivariate systems of equations, particularly an MQ authentication scheme, as the public-key authentication scheme.

Specifically, using the MQ authentication scheme as the public-key authentication scheme enables reduced public key size and higher user visibility of a string expressing a public key. For example, consider the case where the access area is a folder provided in a given area within a data area of storage, and a string corresponding to a public key is included in the folder name in order to set the public key in that folder. In this case, using the MQ authentication scheme as the public-key authentication scheme enables reduced public key size, and allows the string corresponding to that public key to be shorter in length, thereby raising user visibility of the folder name without making the folder name unwieldy. Consequently, using an MQ authentication scheme as the public-key authentication scheme enables improved user utility in a sharing system.

It should be understood by those skilled in the art that various modifications, combinations, sub-combinations and alterations may occur depending on design requirements and other factors insofar as they are within the scope of the appended claims or the equivalents thereof.

Additionally, the present technology may also be configured as below.
(1) An information processing device including:
a public key setter that sets a public key corresponding to a public-key authentication scheme in an access area defined as a given area of an object of access; and
a device authentication processor that authenticates access to the access area against a secret key paired with the public key.

(2) The information processing device according to (1), wherein
the public key setter sets a plurality of differing public keys in a plurality of the access areas, and
the device authentication processor authenticates access to the access areas against a plurality of differing secret keys paired with the plurality of differing public keys.
(3) The information processing device according to (1) or (2), wherein
the access area is at least a partial area within a data area in a memory medium.
(4) The information processing device according to (3), wherein
the access area is a folder created in a partial area of the data area, and
the public key setter sets the public key in the folder by associating the public key with the folder.
(5) The information processing device according to (4), wherein
the public key setter sets the public key in the folder by including a string corresponding to the public key in a folder name of the folder.
(6) The information processing device according to (4), wherein
the public key setter sets the public key in the folder by including information related to the public key in a configuration file inside the folder.
(7) The information processing device according to (4), wherein
the public key setter sets the public key in the folder by including information related to the public key in attribute information for the folder.
(8) The information processing device according to (4), wherein
the public key setter individually sets the public key for each right included in access rights for the folder.
(9) The information processing device according to (8), wherein
the access rights include at least one of a writing right with respect to the folder and a reading right with respect to the folder.
(10) The information processing device according to any one of (1) to (9), wherein
the public-key authentication scheme is an MQ authentication scheme in which the public key corresponds to a high-order, multivariate system of equations, and the secret key corresponds to a solution to the high-order, multivariate system of equations.
(11) The information processing device according to (1) or (2), wherein
the object of access is a physically lockable case, and
the device authentication processor authenticates unlocking of the case by authenticating access to the access area.
(12) An information processing client including:
a client authentication processor that is authenticated for access to an access area defined as a given area of an object of access in an external device, and set with a public key that corresponds to a public-key authentication scheme and pairs with a secret key.
(13) The information processing client according to (12), wherein
the access area is a folder provided in at least a partial area of a data area in a memory medium in the external device, and
the information processing client further includes:
a display controller that, from among a plurality of the folders, causes a display screen to display only the folder set with the public key that pairs with the secret key and corresponds to an authentication process by the client authentication processor.

(14) An access authentication method including:
setting a public key corresponding to a public-key authentication scheme in an access area defined as a given area of an object of access; and
authenticating access to the access area against a secret key paired with the public key.

(15) A program causing a computer to realize the functions of:
setting a public key corresponding to a public-key authentication scheme in an access area defined as a given area of an object of access; and
authenticating access to the access area against a secret key paired with the public key.

What is claimed is:

1. An information processing device, comprising:
   circuitry, communicably connected to a server via a network, configured to:
   set and store in a memory, a first public key corresponding to a public-key authentication scheme in an access area defined as a given area of an object of access, the access area comprises a plurality of folders;
   display, on a display screen, a folder set from the plurality of folders associated with the first public key that is received by the information processing device from a first user that has an access to the displayed folder set; and
   authenticate the access for a second user to the displayed folder set in the access area of the first user based on a secret key paired with a second public key, wherein the secret key is provided by the second user, and wherein the second public key is provided by the second user to the first user.

2. The information processing device according to claim 1, wherein the circuitry is further configured to:
   set a plurality of differing public keys in a plurality of access areas, and
   authenticate the access to the plurality of access areas based on a plurality of differing secret keys paired with the plurality of differing public keys.

3. The information processing device according to claim 1, wherein the access area is at least a partial area within a data area in a memory medium.

4. The information processing device according to claim 3, wherein
   the access area is a folder created in the partial area of the data area, and wherein
   the circuitry is further configured to set the first public key and the second public key in the folder based on an association of the first public key and the second public key with the folder set in the access area of the first user.

5. The information processing device according to claim 4, wherein
   the circuitry is further configured to set the first public key and the second public key in the folder based on a string corresponding to the first public key and the second public key in a folder name of the folder.

6. The information processing device according to claim 4, wherein
   the circuitry is further configured to set the first public key and the second public key in the folder based on a first information related to the first public key and the second public key, respectively in a configuration file inside the folder.

7. The information processing device according to claim 4, wherein
   the circuitry is further configured to set the first public key and the second public key in the folder based on a second information related to the respective first public key and the second public key in an attribute information for the folder.

8. The information processing device according to claim 4, wherein
   the circuitry is further configured to individually set the first public key and the second public key for each right included in access rights for the folder.

9. The information processing device according to claim 8, wherein
   the access rights include at least one of a writing right with respect to the folder or a reading right with respect to the folder.

10. The information processing device according to claim 1, wherein the public-key authentication scheme is an MQ authentication scheme in which the first public key and the second public key correspond to a high-order, multivariate system of equations, and the secret key corresponds to a solution to the high-order, multivariate system of equations.

11. The information processing device according to claim 1, wherein
    the object of access is a physically lockable case, and
    the circuitry is further configured to authenticate unlocking of the physically lockable case by authentication of the access to the access area.

12. The information processing device according to claim 1, wherein the first user receives the second public key from the second user prior to sending the second public key to the information processing device.

13. The information processing device according to claim 1, wherein the second public key and the secret key are stored in a storage unit of the second user.

14. An information processing client, comprising:
    circuitry, communicably connected to a server via a network, configured to:
    be authenticated for an access to an access area defined as a given area of an object of access in an external device based on a secret key that is paired with a first public key, wherein the access area is set with a second public key that corresponds to a public-key authentication scheme, and wherein the first public key pairs with the secret key and is provided by the information processing client to the external device,
    the access area comprising a plurality of folders and a folder set from the plurality of folders is displayed on a display screen, the displayed folder set is associated with the first public key provided and set by another information processing client that has the access to the displayed folder set; and
    store the second public key and the secret key and provide the secret key to the external device to authenticate the access to the displayed folder set.

15. The information processing client according to claim 14, wherein
    the access area is a folder in at least a partial area of a data area in a memory medium in the external device.

16. The information processing client according to claim 14, wherein the circuitry is further configured to transmit an access request to the external device in order to be authenticated to access the access area.

17. An access authentication method, comprising:
in an information processing device comprising circuitry communicably connected to a server via a network:
setting, using the circuitry, a first public key corresponding to a public-key authentication scheme in an access area defined as a given area of an object of access, the access area comprises a plurality of folders;
displaying, on a display screen, a folder set from the plurality of folders associated with the first public key that is received by the circuitry from a first user that has an access to the displayed folder set; and
authenticating, using the circuitry, the access for a second user to the displayed folder set in the access area of the first user based on a secret key paired with a second public key, the secret key is provided by the second user, and wherein the second public key is provided by the second user to the first user.

18. A non-transitory computer-readable medium storing therein computer-executable instructions to cause an information processing device, communicably connected to a server via a network, to execute operations, the operations comprising:
setting and storing in a memory, a first public key corresponding to a public-key authentication scheme in an access area defined as a given area of an object of access, the access area comprises a plurality of folders;
displaying, on a display screen, a folder set from the plurality of folders associated with the first public key that is received by the information processing device from a first user that has an access to the displayed folder set; and
authenticating the access for a second user to the displayed folder set in the access area of the first user based on a secret key paired with a second public key, the secret key is provided by the second user, and wherein the second public key is provided by the second user to the first user.

\* \* \* \* \*